United States Patent
Yasukawa

(10) Patent No.: US 12,427,422 B2
(45) Date of Patent: Sep. 30, 2025

(54) VIDEO PROCESSING METHOD, SERVER DEVICE, AND COMPUTER PROGRAM

(71) Applicant: GREE, Inc., Tokyo (JP)

(72) Inventor: Takashi Yasukawa, Tokyo (JP)

(73) Assignee: GREE, INC., Tokyo (JP)

( * ) Notice: Subject to any disclaimer, the term of this patent is extended or adjusted under 35 U.S.C. 154(b) by 495 days.

(21) Appl. No.: 17/655,494

(22) Filed: Mar. 18, 2022

(65) Prior Publication Data

US 2022/0203239 A1    Jun. 30, 2022

Related U.S. Application Data

(63) Continuation of application No. PCT/JP2020/017694, filed on Apr. 24, 2020.

(30) Foreign Application Priority Data

Sep. 20, 2019  (JP) .................................. 2019-171689
Mar. 12, 2020  (JP) .................................. 2020-043287

(51) Int. Cl.
  *A63F 13/57*    (2014.01)
  *A63F 13/537*   (2014.01)
  (Continued)

(52) U.S. Cl.
  CPC ............ *A63F 13/57* (2014.09); *A63F 13/537* (2014.09); *A63F 13/63* (2014.09); *A63F 13/69* (2014.09);
  (Continued)

(58) Field of Classification Search
  CPC ........ A63F 13/57; A63F 13/537; A63F 13/63; A63F 13/69; G06T 13/00; G06T 2219/024
  See application file for complete search history.

(56) References Cited

U.S. PATENT DOCUMENTS

| 7,958,457 B1 | 6/2011 | Brandenberg |
| 10,311,679 B2 | 6/2019 | Washington |

(Continued)

FOREIGN PATENT DOCUMENTS

| JP | 2012-120098 A | 6/2012 |
| JP | 6431233 | 11/2018 |

(Continued)

OTHER PUBLICATIONS

Solsman, Joan. Twitch just invented this animated emoji that costs $140 to use once. cnet.com. Online. Jun. 27, 2016. Accessed via the Internet. Accessed Apr. 4, 2024. <URL: https://www.cnet.com/tech/services-and-software/twitch-just-invented-this-animated-emoji-that-costs-140-to-use-once/> (Year: 2016).*

(Continued)

*Primary Examiner* — Carl V Larsen
(74) *Attorney, Agent, or Firm* — Finnegan, Henderson, Farabow Garrett & Dunner LLP

(57) ABSTRACT

An aspect of the invention relates to a method, a server device, a computer program for processing a video. A video processing method is performed by execution of a computer-readable command by one or more processors. The method includes receiving, from a terminal device of a viewer of a video including an animation of an avatar object of a distributer via a communication line, a request signal for a first gift to the avatar object, the request signal being generated based on an operation of the viewer of the video, and generating the video including an animation of the avatar object fitted with a second gift having a feature common to the first gift when it is determined that a combination of a plurality of the first gifts given to the avatar object based on a plurality of the request signals satisfies a predetermined condition.

22 Claims, 11 Drawing Sheets

(51) Int. Cl.
  *A63F 13/63*   (2014.01)
  *A63F 13/69*   (2014.01)
  *G06F 13/00*   (2006.01)
  *G06T 13/00*   (2011.01)

(52) U.S. Cl.
  CPC .............. *G06F 13/00* (2013.01); *G06T 13/00* (2013.01); *G06T 2219/024* (2013.01)

(56) References Cited

U.S. PATENT DOCUMENTS

| | | | |
|---|---|---|---|
| 10,796,489 B1 | 10/2020 | Cordes | |
| 2003/0038805 A1* | 2/2003 | Wong | A63F 13/5252 345/473 |
| 2010/0138756 A1 | 6/2010 | Saund | |
| 2011/0212762 A1* | 9/2011 | Ocko | A63F 13/85 463/25 |
| 2015/0019641 A1* | 1/2015 | Nayak | H04L 51/52 709/204 |
| 2016/0184708 A1* | 6/2016 | Ziaja | H04N 21/2407 463/31 |
| 2017/0333785 A1* | 11/2017 | Herring | G07F 17/3213 |
| 2018/0001195 A1* | 1/2018 | Watanabe | A63F 13/795 |
| 2019/0349636 A1 | 11/2019 | Watanabe et al. | |
| 2020/0162796 A1* | 5/2020 | Azuolas | H04N 21/23106 |
| 2020/0197816 A1* | 6/2020 | Chan | A63F 13/35 |
| 2022/0167022 A1* | 5/2022 | Bettner | H04L 65/613 |

FOREIGN PATENT DOCUMENTS

| | | |
|---|---|---|
| JP | 2019-8751 A | 1/2019 |
| WO | WO 2018/142494 A1 | 8/2018 |

OTHER PUBLICATIONS

"Virtual Cast", Internet <URL: https://virtualcast.jp/> (accessed Jul. 3, 2020).
Office Action issued in Japan Patent Office for Japanese Application No. 2019-198441, mailed on Feb. 12, 2020 (7 pages, plus 12 pages of translation).
Yamaguchi, Dwango, "VirtualCast" [online], IT Media Co., Ltd., [Searched on Apr. 13, 2018], Internet <URL: https://www.itmedia.co.jp/news/articles/1804/13/news137.html>.
Suzukakenotami, @Suzukake0, Twitter, [Searched on Mar. 7, 2019], Internet <URL: https://twitter.com/suzukake0/status/1103634455103565824>.
PCT International Search Report for PCT Application No. PCT/JP2020/017694, mailed on Jun. 30, 2020 (3 pages, plus 2 pages of translation).
PCT Written Opinion for PCT Application No. PCT/JP2020/017694, mailed on Jun. 30, 2020 (3 pages).
REALITY, Twitter account, retrieved at https://twitter.com/REALITY_app (15 pages) (accessed Mar. 15, 2022).
REALITY, Twitter account, retrieved at https://twitter.com/WFLE_REALITY (10 pages) (accessed Aug. 2019).
Decision of Refusal issued by the Japanese Patent Office, corresponding with the Japanese Application No. 2022-101777, mailed on Jul. 25, 2023.(4 pages).
Non-Final Office Action issued by U.S. P.T.O. in corresponding with U.S. Appl. No. 17/016,131, mailed Sep. 15, 2022. (15 pages).
Notice of Refusal issued by Japan Intellectual Property Office, corresponding with the Japanese Application No. 2020-136660, mailed on Sep. 14, 2021.(1 O pages).
Non-Final Office Action issued by USPTO in U.S. Appl. No. 18/298,309, mailed on Dec. 22, 2023. (27 pages).
Decision of Refusal issued by the Japanese Patent Office, corresponding with the Japanese Application No. 2020-136660, mailed on Mar. 29, 2022.(4 pages).
Nozawa, "Case 01, Communication with Virtual Character," CG World, Japan, Born Digital K. K. Sep. 1, 2018, vol. 241, pp. 046-051 (10 pages).

* cited by examiner

FIG. 6C

| | Equipped Gift List (Order by gifted) | | | Unequipped Gift List (Order by gifted) |
|---|---|---|---|---|
| 1 | Red Randsel Backpack | | 1 | Diamond crown |
| 2 | Diamond crown | | 2 | Silver Fork |
| 3 | Silver Fork | | 3 | Silver Ring |
| 4 | Golden Paper Fan | | 4 | Copper knife |
| 5 | Gold Ring | | 5 | Black Backpack |
| 6 | White Sneaker | | 6 | White Randsel Backpack |
| | | | 7 | Gold Fork |
| | | | 8 | Gold glasses |
| | | | 9 | Silver spoon |

Distribution user ID: 000001

FIG. 6D

| | Equipped Gift List (Order by gifted) | | | Unequipped Gift List (Order by gifted) |
|---|---|---|---|---|
| 1 | Red Randsel Backpack | | 1 | Diamond crown |
| 2 | Diamond crown | | 2 | Silver Fork |
| 3 | Silver Fork | | 3 | Silver Ring |
| 4 | Golden Paper Fan | | 4 | Copper knife |
| 5 | Gold Ring | | 5 | Black Backpack |
| 6 | White Sneeker | | 6 | White Randsel Backpack |
| | | | 7 | Gold Fork |
| | | | 8 | Gold glasses |
| | | | 9 | Silver spoon |

Distribution user ID: 000001

VIDEO PROCESSING METHOD, SERVER DEVICE, AND COMPUTER PROGRAM

CROSS REFERENCE TO RELATED APPLICATIONS

This application claims priority to Japanese Patent Application No. 2019-171689 filed Sep. 20, 2019 and Japanese Patent Application No. 2020-043287 filed Mar. 12, 2020, the contents of which are incorporated herein by reference in their entirety.

BACKGROUND

Technical Field

The invention disclosed in the specification relates to a method for processing a video viewed by a user, a server device for controlling the video, and a computer program for controlling the same.

Related Art

A service for distributing a video to a terminal device via a network is conventionally known. In the video distribution service of this kind, an avatar (avatar object) of a distribution user (distributer) of the video is displayed, and a viewing user (viewer) of the video and the distributer can communicate with each other through a message, a chat or the like.

Also, an act of providing an item acquired by a viewer to an avatar (distributer) in a video as a present, which is called gifting, is known.

In some video distribution services, a viewer may be able to perform gifting for a body part of an avatar (distributer).

The above-mentioned gifting creates a sense of closeness and a feeling of participation of the viewer with respect to the avatar through direct communication between the viewer and the distributer (avatar). However, in the gifting based on fitted portions of the avatar, when a video including an avatar in which, for example, one viewer provides gifting with respect to the head of the avatar and a gift based on the gifting is attached to the head is distributed, other viewers cannot gift with respect to the head of the avatar during a predetermined time from when the gift mounted on the head is deleted from the video. Even if the other viewer gifts, the gift based on the gifting is not mounted on the head of the avatar. Therefore, in the case of the gifting control like this, only a limited gifting act is reflected in the video. As such, the gifting opportunity by the viewer is limited. As a result, there is a problem that the viewer's motivation to gifting is suppressed.

On the other hand, as a method for solving the above-described problem, for example, when one viewer makes a gift A with respect to the head of the avatar and a video including an avatar in which the gift A based on the gifting is attached to the head is distributed, an alternative plan for controlling the gift A is proposed such that when the other viewer makes a gift B with respect to the head of the avatar, the gift A is immediately overwritten by the gift B. However, in this case, the gift A is suddenly deleted from the video due to the gifting by the other viewer. Therefore, the above-mentioned alternative plan has a problem that the viewer of the gift A becomes disappointed with the gifting.

In addition, the gifting is a mode in which a viewer purchases a gift by paying a consideration to a service provider who provides a video distribution service, and the viewer gives the gift to a distributer (avatar). Therefore, increasing gifting opportunities by viewers is a challenge for a service provider.

SUMMARY

Accordingly, it is an object of the invention is to provide a video processing method, a server device, and a computer program for increasing gifting opportunities by a viewer.

In one embodiment, a video processing method is performed by execution of a computer-readable command by one or more processors. The method includes receiving, from a terminal device of a viewer of a video including an animation of an avatar object of a distributer via a communication line, a request signal for a first gift to the avatar object, the request signal being generated based on an operation of the viewer of the video, and generating the video including an animation of the avatar object fitted with a second gift having a feature common to the first gift when it is determined that a combination of a plurality of the first gifts given to the avatar object based on a plurality of the request signals satisfies a predetermined condition.

A server device according to one embodiment is provided with one or more processors, wherein the processor receives, from a terminal device of a viewer of a video including an animation of an avatar object of a distributer via a communication line, a request signal for a first gift to the avatar object, the request signal being generated based on an operation of a viewer of the video, and generates the video including an animation of the avatar object fitted with a second gift having a feature common to the first gift when it is determined that a combination of a plurality of the first gifts given to the avatar object based on a plurality of the request signals satisfies a predetermined condition.

A server device according to another embodiment includes one or more processors, wherein the processor receives, from a terminal device of a viewer of a video including an animation of an avatar object of a distributer via a communication line, a request signal for a first gift to the avatar object, the request signal being generated based on an operation of the viewer of the video, and transmits information related to the second gift having a feature common to the first gift to the terminal device of the viewer generating the video including an animation of the avatar object fitted with the second gift or to a terminal device of a distributer when it is determined that a combination of a plurality of the first gifts given to the avatar object based on a plurality of the request signals satisfies a predetermined condition.

In yet another aspect, a non-transitory computer-readable video processing program is provided and causes one or more processors to perform a step of receiving, from a terminal device of a viewer of a video including an animation of an avatar object of a distributer via a communication line, a request signal for a first gift to the avatar object, the request signal being generated based on an operation of a viewer of the video, and a step of generating the video including an animation of the avatar object fitted with a second gift having a feature common to the first gift when it is determined that a combination of a plurality of the first gifts given to the avatar object based on a plurality of the request signals satisfies a predetermined condition.

Also, a non-transitory computer-readable video processing program is provided and causes one or more processors to perform a step of receiving, from a terminal device of a viewer of a video including an animation of an avatar object of a distributer via a communication line, a request signal for a first gift to the avatar object, the request signal being generated based on an operation of a viewer of the video, and a step of transmits information related to the second gift having a feature common to the first gift to the terminal device of the viewer generating the video including an animation of the avatar object fitted with the second gift or to a terminal device of a distributer when it is determined that a combination of a plurality of the first gifts given to the avatar object based on a plurality of the request signals satisfies a predetermined condition.

In another aspect, a non-transitory computer-readable video processing program is provided and causes one or more processors to perform a step of transmitting, via a communication line, a request signal for a first gift to an avatar object, the request signal being generated based on an operation of a viewer of a video including an animation of the avatar object, and a step of receiving information related to the second gift from a terminal device of a distributer or a server device to generate the video including an animation of the avatar object fitted with the second gift having a feature common to the first gift when it is determined that a combination of a plurality of the first gifts given to the avatar object based on a plurality of the request signals satisfies a predetermined condition.

In yet another aspect, a non-transitory computer-readable video processing program is provided and causes one or more processors to perform a step of transmitting, via a communication line, a request signal for a first gift to an avatar object, the request signal being generated based on an operation of a viewer of a video including an animation of the avatar object, and a step of receiving information related to the second gift from a terminal device of a distributer or a server device to generate the video including an animation of the avatar object fitted with the second gift having a feature common to the first gift when it is determined that a combination of a plurality of the first gifts given to the avatar object based on a plurality of the request signals satisfies a predetermined condition.

Furthermore, a non-transitory computer-readable video processing program is provided and causes one or more processors to perform a step of transmitting, via a communication line, a request signal for a first gift to an avatar object, the request signal being generated based on an operation of a viewer of a video including an animation of the avatar object, and a step of receiving, from a terminal device of a distributer or a server device, the video including an animation of the avatar object fitted with the second gift having a feature common to the first gift when it is determined that a combination of a plurality of the first gifts given to the avatar object based on a plurality of the request signals satisfies a predetermined condition.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention.

BRIEF DESCRIPTION OF DRAWINGS

FIG. 6C is a diagram illustrating an example of a table managed by the database unit, and is a diagram schematically showing an image when a determination unit determines.

FIG. 6D is a diagram illustrating an example of a table managed by the database unit, and is a diagram schematically showing an image when a determination unit determines.

DETAILED DESCRIPTION

Figure 1:
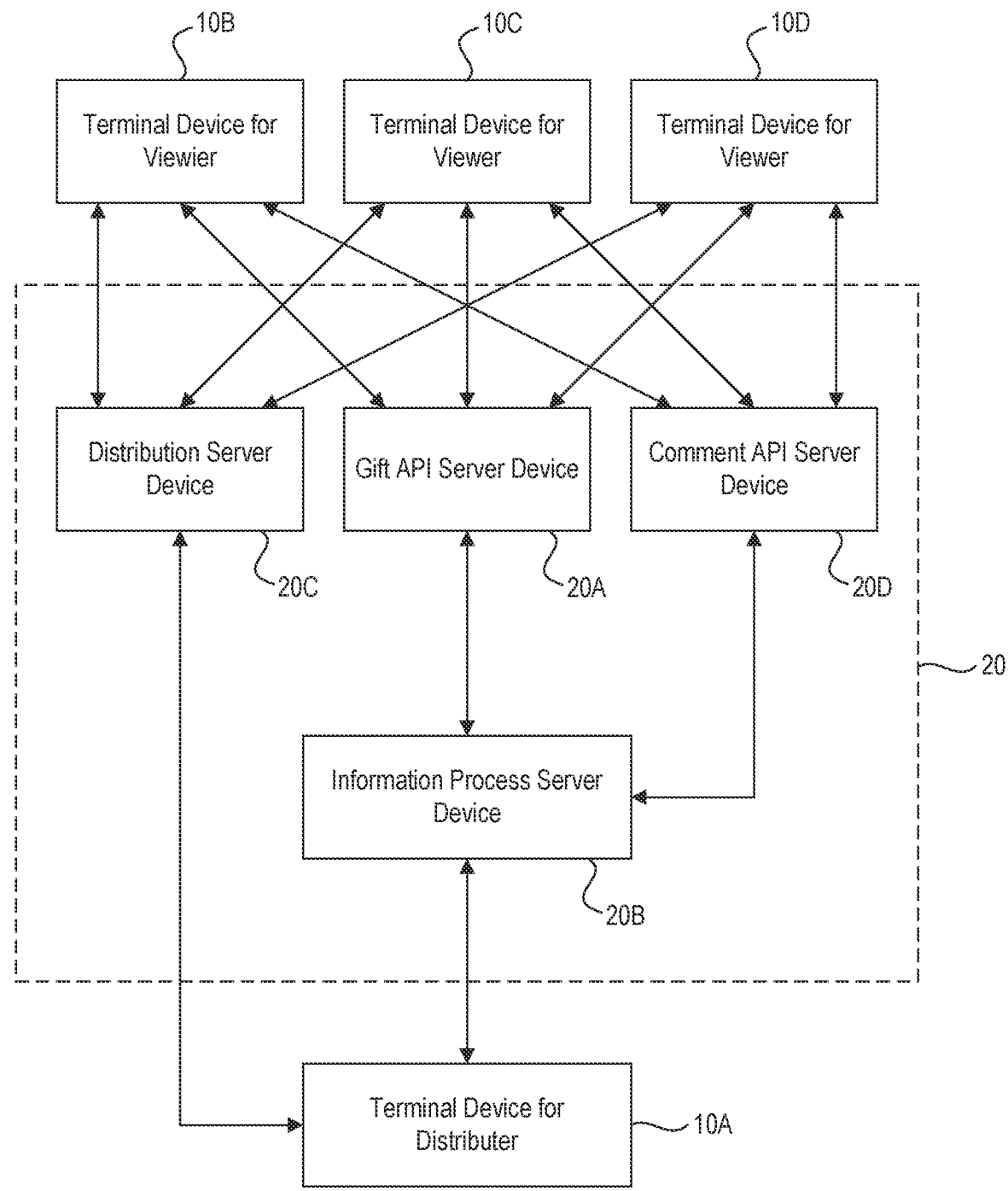
FIG. 1 is a block diagram showing an example of a configuration of a video distribution system according to an embodiment.

Various embodiments of the present invention will be described below with reference to the accompanying drawings. The same reference numerals are given to the components common in the drawings. It should be noted that constituent elements expressed in a certain drawing may be omitted in another drawing for convenience of explanation. Further, it is noted that the attached drawings are not necessarily to scale. Further, the term "application" may be referred to as software or a program, and may be a command to a computer and may be combined so as to obtain a certain result. As used herein, unless specifically stated otherwise, the term "and/or" encompasses all possible combinations, except where infeasible. For example, if it is stated that a component includes A and/or B, then, unless specifically stated otherwise or infeasible, the component may include A, or B, or A and B.

1. CONFIGURATION OF VIDEO DISTRIBUTION SYSTEM

A video distribution system 1 according to one embodiment disclosed herein can distribute a video to a terminal device of a viewer viewing a video via a communication line by a distributer who performs distribution by using the terminal device. As an example of the video, an animation of an avatar object (first avatar object) generated on the basis of data related to the action of the distributer and/or voice data related to the utterance or singing by the distributer is included.

FIG. 1 is a block diagram illustrating an example of a configuration of a video distribution system 1 according to an embodiment. As shown in FIG. 1, the video distribution system 1 can include a plurality of terminal devices 10 connected to a communication line (not shown) and one or more server devices 20 connected to the communication line. Each terminal device 10 is connected to one or more server devices 20 via a communication line The communication line can include a cellular phone network, a wireless LAN, a fixed telephone network, an Internet, an intranet and/or an Ethernet (registered trademark) or the like without being limited thereto.

1-1. Terminal Device 10

As shown in FIG. 1, the plurality of terminal devices 10 can include one or more terminal devices 10 (in this case, a terminal device 10A) and one or more viewers' terminal devices 10 (here, terminal devices 10B-10D). Each terminal device 10 has a common configuration, and can be either a terminal device (a distributer terminal device 10) for distributing a video and a terminal device (terminal device 10 of a viewer) for viewing a video.

When each terminal device 10 operates as the terminal device 10 of the distributer, the installed video distribution application is first executed. Each terminal device 10 acquires data related to the action or operation of the distributer and/or voice data related to the utterance and singing by the distributer, and generates a video including the animation of the virtual character (avatar object) changed according to the acquired data. Furthermore, each terminal device 10 can transmit the video to the server device 20 (distribution server device 20C) via a communication line. The video is distributed from a server device 20 (distribution server device 20C) to a terminal device 10 (a terminal device 10 of a viewer) for receiving a video via a communication line. In the terminal device 10 (the terminal device 10 of the viewer) for receiving the video, when receiving the video, the installed video viewing application is executed.

Further, when the server device 20 receives a request signal for requesting the application of a gift (first gift), which is gifting, to the fitted portion of the distributer (avatar object) on the basis of the operation of the viewer via the communication line, each terminal device 10 operating as the terminal device 10 of the distributer receives the request signal from the server device 20 (information processing server device 20b). Each terminal device 10 generates a video including an animation in a state in which a first gift is attached to a fitted portion of the avatar object.

The fitted portion of the avatar object means a portion of an avatar object such as a head, a face, a neck, a right hand, a left hand, a right foot, a left foot, or the like of the avatar object, and/or a portion separated from the avatar object (including a space surrounding the avatar object such as an overhead, an underfoot, a behind or the like). Throughout the specification, the term "fitting" may be used interchangeably with equipped, mounted, fitted with respect to a gift or gifting.

When a plurality of request signals to give the first gift for a fitted portion of the avatar are transmitted (the multiple request signals from one viewer terminal device 10 or multiple viewer terminal devices 10), the terminal device 10 of the distributer can receive from the server device 20 (information processing server device 20B), information for requesting generation of a video including an animation in a state in which a second gift having a characteristic common to the first gift is attached to a fitted portion of the avatar object. When receiving the request information from the server device 20, the terminal device 10 of the distributer can generate a video including an animation in a state in which the second gift is attached.

A method of determining whether or not to generate a video including an animation in a state in which the second gift is attached to the fitted portion of the avatar object will be described later. The determination is executed by a server device 20 (information processing server device 20B) to be described later.

On the other hand, when the terminal device 10 operates as a terminal device (terminal device of a viewer) for viewing a video, the installed application for viewing a video is first executed. Each terminal device 10 can receive the video distributed by the terminal device 10 of the distributer via the server device 20 (distribution server device 20C).

Furthermore, when the terminal device 10 operates as a terminal device of a viewer, the terminal device 10 can transmit a request signal for requesting the application of a gift (first gift) to the fitted portion of the distributer (avatar object) to the server device 20 (gift API server device 20A) on the basis of the operation of the viewer by executing the video viewing application.

Also, when each terminal device 10 operates as a viewer terminal device, it can transmit information related to comments from the viewer to the distributer (avatar object) to the server device 20 (comment API server device 20D) by performing the video viewing application.

Moreover, the aforementioned video distribution application and the video viewing application may be stored and executed in each terminal device 10 as a combined application or separate applications.

Each terminal device 10 may be any terminal device that can perform this function such as, but not limited to, a smart phone, a tablet, a mobile phone (feature phone) or/and a personal computer or the like.

1-2. Server Device 20

As shown in FIG. 1, the server device 20 may be called as a video distribution system including a combination of multiple server devices described later.

The server device 20 can distribute the video transmitted from the terminal device 10 of the distributer to the terminal device 10 of each viewer.

Furthermore, the server device 20 can receive, from the terminal device 10 of each viewer, a request signal for requesting the application of a gift (first gift), which is gifting, to the fitted portion of the avatar object. The server device 20 can transmit information related to the request signal to the terminal device 10 of the distributer. Further, the server device 20 can receive the video generated by the terminal device 10 of the distributer who has received the information from the terminal device 10 of the distributer. The video includes a video including an animation in a state in which the gift is attached to a fitted portion of the avatar object.

When a plurality of request signals to give the first gift for a fitted portion of the avatar are transmitted (the multiple request signals from one viewer terminal device 10 or multiple viewer terminal devices 10), the server device 20 determines whether or not to generate a video including the animation in a state in which the second gift is attached to the fitted portion of the avatar object. When the server device 20 determines to generate the video, the server device 20 can transmit information for requesting generation of the video to the terminal device 10 of the distributer. Then, the server device 20 can receive a video including an animation in a state in which a second gift is attached to a fitted portion of the avatar object from the terminal device 10 of the distributer.

Further, the server device 20 can receive information related to a comment for the distributer (avatar object) from the viewer from the terminal device 10 of the viewer, and can distribute the comment to a viewer who views the same video.

In order to execute such an operation, the server device 20 can include a gift API server device 20A, an information processing server device 20B, a distribution server device 20C, and a comment API server device 20D connected to each other via a communication line (including a radio channel and/or a wired line).

The gift API server device 20A can receive, from the terminal device 10 of each viewer, a request signal for requesting the application of a gift (first gift), which is gifting, to the fitted portion of the avatar object on the basis of the operation of the viewer. In this case, the gift API server device 20A can read at least identification information of the viewer who did gifting (the serial number of the terminal device 10 of each viewer, the ID information provided to each viewer, or the like), information related to the gift subject to gifting (information on what kind of gift corresponding to any fitted portion of the avatar object), and identification information of the distributer as the avatar object of the gifting object (the serial number of the terminal device 10 of the distributer, the ID information given to the distributer, or the like). Also, the gift AP server device 20A can transmit the read information to the information processing server device 20B when an inquiry is automatically received from the information processing server device 20B.

The information processing server device 20B automatically, or based on self-inquires, receives information read by the gift API server device 20A from the gift API server device 20A. The information processing server device 20B can have a table (database) for each distributer and can store information related to the gift read by the gift API server device 20A in each table.

Furthermore, the information processing server device 20B can determine whether or not to generate a video including an animation in a state in which a second gift having a characteristic common to the first gift is attached to a fitted portion of the avatar object when there is a plurality of gifting actions by the viewer of the plurality of gifting actions (including both of a plurality of gifting actions by a plurality of viewers) by referring to the information related to the gift stored in the table. The determination is determined based on whether a combination of a plurality of gifting actions (a plurality of first gifts) satisfies a predetermined condition set in advance.

Further, the information processing server device 20B can transmit, to the terminal device 10 of the distributer, information for requesting generation of a video including an animation in a state in which the first gift is attached to a fitted portion of the avatar object by referring to the information related to the gift stored in the table. Similarly, when it is determined by the above determination that a video including an animation in a state in which the second gift is attached is generated, information for requesting generation of a video including an animation in a state in which the second gift is attached to the fitted portion of the avatar object can be transmitted to the terminal device 10 of the distributer.

Furthermore, the information processing server device 20B can transmit, to the comment API server device 20D, all or a part of information related to which viewer has given any gift to the fitted portion (distributer) of the avatar object by referring to the identification information of the viewer stored in the table and the information related to the gift.

Further, the information processing server device 20B can calculate a necessary condition related to which combination satisfies the predetermined condition if the combination of a plurality of gifting actions (a plurality of first gifts) is determined not to satisfy a predetermined condition set in advance. Furthermore, the information processing server device (20B) can transmit the necessary condition to the comment API server device (20D). Details of the necessary conditions herein will be described later.

The distribution server device 20C can distribute the video transmitted from the terminal device 10 of the distributer to the terminal device 10 of each viewer.

In addition, the distribution server device 20C can receive a video including an animation in a state in which a first gift is attached to a fitted portion of the avatar object from the terminal device 10 of the distributer, and distribute the video to the terminal device 10 of each viewer.

Furthermore, the distribution server device 20C can receive a video including an animation in a state in which a second gift is attached to a fitted portion of the avatar object from the terminal device 10 of the distributer, and distribute the video to the terminal device 10 of each viewer.

The comment API server device 20d can receive the comment of the viewer from the terminal device 10 of the viewer, and can distribute the received comment to each viewer viewing the same video.

The comment API server device 20D can receive, from the information processing server device 20B, a comment corresponding to all or a part of information related to which viewer has given any gift to the fitted portion (distributer) of the avatar object. The comment API server device 20D can distribute the received comment to each viewer viewing the same video.

Further, the comment API server device 20D can receive a comment corresponding to the necessary condition from the information processing server device 20B. The comment API server device 20D can distribute the received comment to each viewer viewing the same video.

In the example shown in FIG. 1, the server device 20 has four server devices including a gift API server device 20A, an information processing server device 20B, a distribution server device 20C, and a comment API server device 20D for the purpose of distributing the load. However, at least one of the four server devices may be integrated with any of the remaining server devices.

2. HARDWARE CONFIGURATION OF EACH DEVICE

Next, an example of a hardware configuration of each of the terminal device 10 and the server device 20 will be described.

2-1. Hardware Configuration of Terminal Device 10

Figure 2:
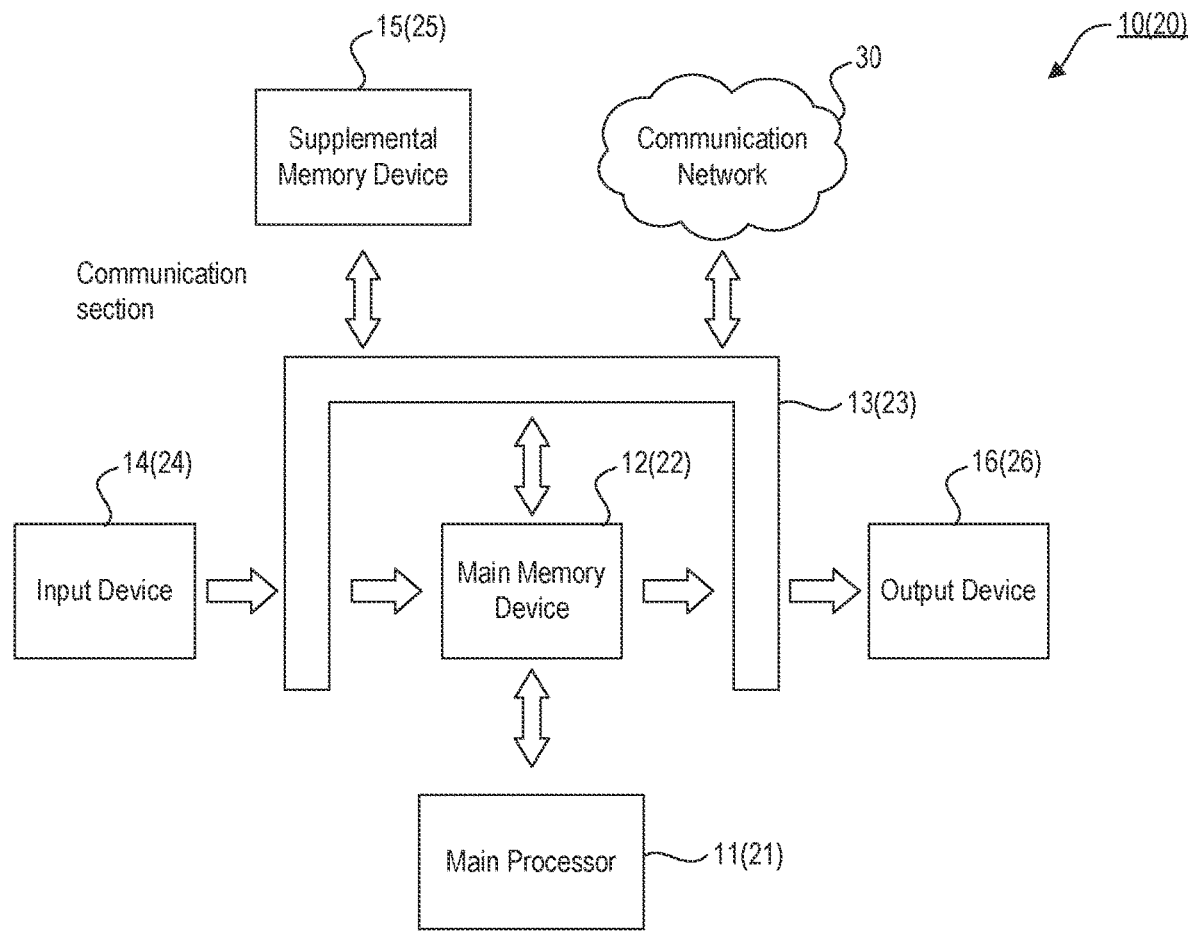
FIG. 2 is a block diagram schematically showing an example of a hardware configuration of the terminal device (server device) shown in FIG. 1.

A hardware configuration example of each terminal device 10 will be described with reference to FIG. 2. FIG. 2 is a block diagram schematically showing an example of a hardware configuration of the terminal device 10 (server device 20) shown in FIG. 1. (In FIG. 2, reference signs in parentheses are described in association with the server device 20 as will be described later.)

As shown in FIG. 2, each terminal device 10 mainly includes a central processing unit 11, a main storage device 12, an input/output interface device 13, an input device 14, an auxiliary storage device 15, and an output device 16. These devices are connected to each other by a data bus and/or a control bus.

The central processing unit 11 is referred to as a "CPU" and performs calculation on the instruction and data stored in the main storage device 12, and stores the result of the calculation in the main storage device 12. Further, the central processing unit 11 can control the input device 14, the auxiliary storage device 15, and the output device 16 or the like via the input/output interface device 13. The terminal device 10 can include one or more such central processing units 11.

A main storage device 12 is referred to as a "memory" and stores instructions and data received from an input device 14, an auxiliary storage device 15 and a communication line 30 (server device 20 or the like) via an input/output interface device 13, and a calculation result of the central processing unit 11. A main storage device 12 can include a RAM (random access memory), a ROM (read-only memory), a flash memory or the like, without being limited thereto.

The auxiliary storage device 15 is a storage device having a capacity larger than that of the main storage device 12. The auxiliary storage device 15 stores instructions and data (computer programs) constituting the specific application (video distribution application, video viewing application, etc.), a web browser, etc. and is controlled by the central processing unit 11, so that these instructions and data (computer program) can be transmitted to the main storage device 12 via the input/output interface device 13. The auxiliary storage device 15 can include a magnetic disk device and/or an optical disk device without limiting them.

The input device 14 is a device for acquiring data from the outside, and includes a touch panel, a button, a keyboard, a mouse, and/or a sensor without limiting them. The sensor can include a sensor including one or more cameras, such as one or more cameras, and/or one or more microphones, without being limited thereto, as will be described later.

The output device 16 can include a display device, a touch panel and/or a printer device or the like without being limited thereto.

In such a hardware configuration, the central processing unit 11 loads an instruction and data (computer program) constituting the specific application stored in the auxiliary storage device 15 sequentially to the main storage device 12, and calculates the loaded instruction and data, thereby controlling the output device 16 via the input/output interface device 13. Alternatively, the central processing unit 11 can transmit and receive various information to/from another device (for example, the server device 20 and the other terminal device 10) via the input/output interface device 13 and the communication line 30 (communication network 30).

Thus, the terminal device 10 can execute an operation necessary for generating a video, an operation necessary for transmitting (distributing) and/or receiving the video, an operation necessary for the gifting act, and an operation necessary for transmitting the comment (including various operations described later in detail later) by executing the installed specific application.

The terminal device 10 May include one or more microprocessors and/or a graphics processing unit (GPU) in place of the central processing unit 11 or together with the central processing unit 11.

2-2. Hardware Configuration of Server Device 20

A hardware configuration example of each server device 20 will be described with reference to FIG. 2. As a hardware configuration of each server device 20 (gift API server device 20A, information processing server device 20B, distribution server device 20C, and comment API server device 20D), for example, the same hardware configuration of each terminal device 10 can be used. Therefore, a reference sign for a component included in each server device 20 is shown in parentheses in FIG. 2.

As shown in FIG. 2, each server device 20 mainly includes a central processing unit 21, a main storage device 22, an input/output interface device 23, an input device 24, an auxiliary storage device 25, and an output device 26. These devices are connected to each other by a data bus and/or a control bus.

The central processing unit 21, the main storage device 22, the input/output interface device 23, the input device 24, the auxiliary storage device 25, and the output device 26 can be substantially the same as the central processing unit 11, the main storage device 12, the input/output interface device 13, the input device 14, the auxiliary storage device 15, and the output device 16 included in the respective terminal devices 10.

In such a hardware configuration, the central processing unit 21 loads an instruction and data (computer program) constituting the specific application stored in the auxiliary storage device 25 sequentially to the main storage device 22, and calculates the loaded instruction and data, thereby controlling the output device 26 via the input/output interface device 23. Alternatively, the central processing unit 21 can transmit and receive various information to/from another device (for example, each terminal device 10 or the like) via the input/output interface device 23 and the communication line 30 (communication network 30).

Thus, the server device 20 can execute an operation necessary for distributing the video transmitted by the terminal device 10 of each distributer to the terminal device 10 of each viewer, an operation necessary for receiving the gifting act transmitted from the terminal device 10 of each viewer, an operation necessary for generating the video to the terminal device 10, an operation necessary for transmitting (distributing) and/or receiving the video, and the like (including various operations described later in detail later).

The server device 20 may include one or more microprocessors and/or a graphics processing unit (GPU) in place of the central processing unit 21 or together with the central processing unit 21.

3. FUNCTION OF EACH DEVICE

Next, an example of the details of the functions of the terminal device 10 and the server device 20 will be described.

3-1. Function of Terminal Device 10

Figure 3:
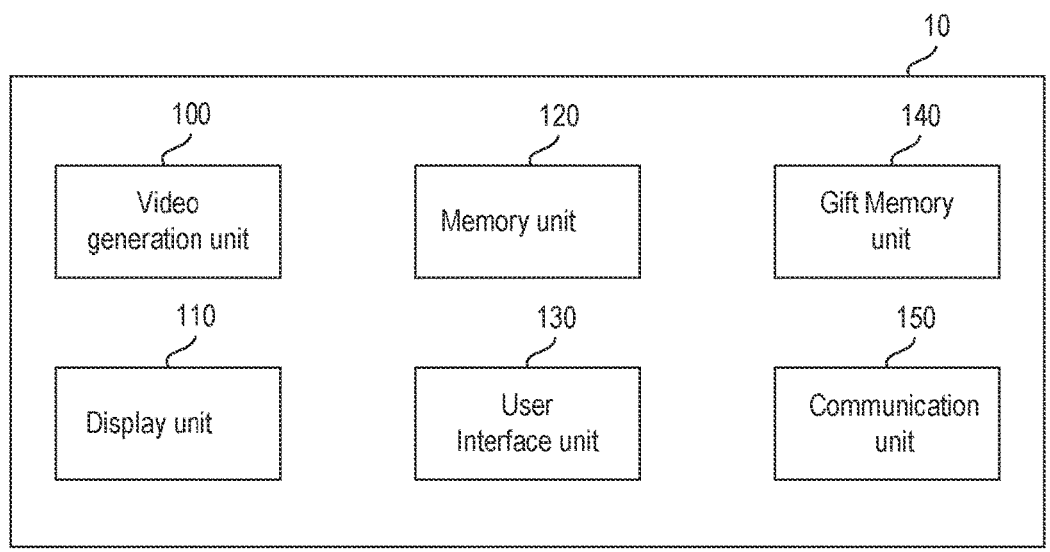
FIG. 3 is a block diagram schematically showing an example of a function of the terminal device shown in FIG. 1.

An example of the function of the terminal device 10 will be described with reference to FIG. 3. FIG. 3 is a block diagram schematically showing an example of the function of the terminal device 10 shown in FIG. 1

As shown in FIG. 3, the terminal device 10 mainly includes a video generation unit 100, a display unit 110, a storage unit 120, a user interface unit 130, a gift storage unit 140, and a communication unit 150.

(1) Video Generation Unit 100

The video generation unit 100 can generate a video including an animation of an avatar object (a first avatar object) of the distributer on the basis of data related to an operation of the distributer and/or voice data related to singing and singing uttered by the distributer. In order to achieve this, the video generation unit 100 can include, for example, an acquisition unit (not shown) and a processing unit (not shown).

The acquisition unit can include one or more first sensors (not shown) for acquiring data related to a face of a distributer, a hand foot, or the like (whole body). Further, the acquisition unit can include one or more second sensors (not shown) for acquiring voice data related to the utterance and/or singing uttered by the distributer.

In a preferred embodiment, the first sensor may include an RGB camera that captures an image of visible light, and a near-infrared camera that captures an image of the near-infrared ray. As such a camera, it is possible to use, for example, a camera included in a True Depth camera of an iPhone X (registered trademark). The second sensor may include a microphone for recording voice.

First, regarding a first sensor, an acquisition unit captures an image of a face, a hand, and the like of a distributer by using a first sensor arranged close to a face, a hand, or the like of a distributer. Thus, the acquisition unit can generate data (for example, an MPEG file) in which the image acquired by the RGB camera is recorded for a unit time in association with the time code (code indicating the acquired time). Further, the acquisition unit can generate data (for example, a TSV file [a file formatted for recording multiple data by dividing data with a tab]) in which a predetermined number (for example, 51) of numerical values of depth acquired by the near-infrared camera is recorded in association with the time code.

In the near-infrared camera, specifically, an infrared laser forming a dot pattern by a dot projector is radiated to a face or a hand of a distributer, and the near-infrared camera captures an infrared dot projected and reflected on the face, the hand, or the foot of the distributer, and generates an image of the infrared dot. The acquisition unit compares an image of a dot pattern radiated by a dot projector registered in advance with an image captured by a near-infrared camera to acquire points (for example, 51 points and features). The depth of each point (each feature point) (for example, each point, the distance between each feature point and the near-infrared camera) can be calculated. The acquisition unit can generate data in which a numerical value indicating the calculated depth is recorded for a unit time in association with the time code as described above.

Next, with respect to the second sensor, the acquisition unit acquires voice related to utterance and/or singing uttered by the distributer by using a second sensor arranged close to the distributer. Thus, the acquisition unit can generate data (for example, an MPEG file) recorded for a unit time in association with the time code. In one embodiment, the acquisition unit acquires data related to a face and a hand of a distributer by using a first sensor, and at the same time, can acquire voice data related to utterance and/or singing uttered by a distributer by using a second sensor. In this case, the acquisition unit can generate data (for example, an MPEG file) in which an image acquired by an RGB camera and voice data related to utterance and/or singing uttered by a distributer using a second sensor are recorded in a unit time in association with the same time code.

The acquisition unit can output data (MPEG file and TSV file or the like) related to the face, hand foot, etc. of the distributer generated as described above, and/or voice data (MPEG file or the like) related to the utterance and/or singing uttered by the distributer to the processing unit.

Although the case where the first sensor includes the RGB camera and the infrared camera has been described here, the first sensor may include, for example, (A) a camera for detecting infrared rays emitted by the infrared laser and reflected by the face, hand, or the like of the distributer, (B) a plurality of RGB cameras for imaging the visible light, and (C) a single camera for imaging the visible light. In the case of (A) described above, the acquisition unit can calculate the depth for each feature point in the face, the hand, or the like of the distributer by a method similar to the method described above. In the case of (B), the acquisition unit can calculate the depth (depth) for each feature point in the face, the hand, or the like of the distributer by using a plurality of images captured by the plurality of RGB cameras. In the case of (C), the acquisition unit can calculate the depth of each feature point in the face, the hand, or the like of the distributer from the image captured by the single camera by using deep learning or the like. In the case of (C), the acquisition unit may calculate the depth of each feature point in the face of the distributer, the hand foot, or the like by analysis processing (image processing or the like) to the image captured by the single camera.

The processing unit can generate a video including an animation of a virtual character (avatar object) on the basis of data relating to the face of the distributer, the hands, and the like from the acquisition unit. For the video itself of the avatar object, the processing unit can generate a video of the avatar object by executing rendering on a rendering unit (not shown) using various information (for example, geometry information, bone information, texture information, shader information, and blend shape information) stored in a character data storage unit (not shown).

In order to generate a video including the animation of the avatar object of the distributer on the basis of the data related to the operation of the distributer and/or the voice data related to the utterance and the singing uttered by the distributer, another arbitrary well-known technique can be used.

When a communication unit 150, which will be described later, receives, from the server device 20 (information processing server device 20B), request information for generating a video including an animation in a state in which a first gift or a second gift is attached to the fitted portion of the avatar object, the video generation unit 100 can receive the request information from the communication unit 150 and generate the video. In this case, the video generation unit 100 generates data relating to a video including the animation of the avatar object generated in detail as described above and combine data related to the first gift or the second gift (data relating to gift as to which fitting of portion of the avatar, shape, size, or color). Thus, the video generation unit 100 can generate a video including an animation in a state in which the first gift or the second gift is attached to the fitted portion of the avatar object. In the first gift and the second gift, information (fitting position information) related to which fitted portion of the avatar object is mounted is set in advance. As a result, the video generation unit 100 can generate a video in which a first gift or a second gift is displayed at a fitted portion based on the fitting position information when a predetermined condition, which will be described later, is satisfied from the viewer. For example, when the first gift is a "red randsel backpack", the fitting position information is the "back". Therefore, when the "red randsel backpack" is gifted from the viewer, the video generation unit 100 displays the "red randsel backpack" on the video so as to cover at least a part of the "back" of the avatar object (or so as to be in contact with at least a part of the "back"). Similarly, when the second gift is a "large fork having a rainbow color", the fitting position information is the "left hand" ("right hand"), and when a predetermined condition described later is satisfied in the "left hand", the video generation unit 100 generates the video so as to contact the "left hand" of the avatar object (so as to cover a part of the "left hand") The "large fork having a rainbow color" is displayed on a video. The position (position information) of each fitted portion of the avatar object in the video is detected, for example, by a sensor such as a motion sensor described later. Therefore, when the "red randsel backpack" is displayed on the "back" of the avatar object, the position information of the "back" at that time point is referred to, and the "red randsel backpack" is displayed on the video corresponding to the "back". In addition, the displayed first gift and the second gift may be displayed on the video so as to move accompanying the movement of the mounted portion of the mounted avatar object during the time period during which the first gift and the second gift are displayed (the duration described later). As described above, a method for generating a video including an animation in a state in which a first gift or a second gift is attached to a fitted portion of an avatar object can be used as a method described in Japanese Patent No. 6431233 or another well-known technique.

(2) Display Unit 110

The display unit 110 can display various information required for distribution and/or viewing of a video (including a video including an animation in a state in which a first gift or a second gift is attached to a fitted portion of the avatar object). For example, the display unit 110 can display the distributed video, the received video, and/or the generated video or the like. The display unit 110 can display various comments distributed from the server device 20 to each terminal device 10 together with the received video. Further, the gift information stored in the gift storage unit 140 can be appropriately displayed according to the operation of the viewer.

(3) Storage Unit 120

A storage unit 120 can store various information required for distribution and/or viewing of a video (including a video including an animation in a state in which a first gift or a second gift is attached to a fitted portion of the avatar object)

(4) User Interface Unit 130

A user interface unit 130 can input various information required for distribution and/or viewing of a video (including a video including an animation in a state in which a first gift or a second gift is attached to a fitted portion of the avatar object) via an operation of a distributer or a viewer. For example, the user interface unit 130 can input, from the viewer, operation data indicating the content of a viewer operation (including an operation such as selecting a predetermined gift from a plurality of first gifts prepared in advance) related to gifting on the avatar object and selecting a command to be given to the avatar object, and outputting the operation data to the communication unit 150. Here, the above-described operation data can include, for example, information relating to which gift (the type of a gift) to be distributed to the distributer by the viewer.

As another example, the user interface unit 130 can input operation data related to an answer to the inquiry from the distributer and output the operation data to the communication unit 150 when receiving an inquiry about the attachment of a gift (first gift or second gift) corresponding to the gifting to the fitted portion of the avatar object from the server device 20, when one or a plurality of giftings are performed from the viewer.

(5) Gift Storage Unit 140

When the video distribution application and the video viewing application are installed in the terminal device 10, the gift storage unit 140 can store gift information set in advance in these applications. The gift information may be a name, shape, identification information such as the color or the like, of each gift, or the amount of each gift to be charged to the viewer when the viewer performs the gifting.

(6) Communication Unit 150

The communication unit 150 can communicate, with the server device 20, various information required for distribution and/or viewing of a video (including a video including an animation in a state in which a first gift or a second gift is attached to a fitted portion of the avatar object). For example, when the terminal device 10 operates as the terminal device 10 of the distributer, the communication unit 150 receives, from the server device 20 (information processing server device 20*b*), request information for generating a video including an animation in a state in which the first gift or the second gift is attached to the fitted portion of the avatar object. The generated video can be transmitted to the server device 20 (distribution server device 20*c*). When the terminal device 10 operates as the terminal device 10 of the distributer and when one or a plurality of guests are performed from the viewer, the communication unit 150 can receive, from the server device 20, an inquiry about the attachment of a gift (first gift or second gift) corresponding to the gifting to the fitted portion of the avatar object. Furthermore, the communication unit 150 outputs the inquiry information to the display unit 110, receives operation data relating to an answer to the inquiry from the user interface unit 130, and transmits the information relating to the answer to the server device 20.

On the other hand, when the terminal device 10 operates as the terminal device 10 of the viewer, the communication unit 150 can receive the video generated by the terminal device 10 of the distributer from the server device 20. In addition, when the terminal device 10 operates as the terminal device 10 of the viewer, the information relating to the gifting to the distributer (avatar object) from the viewer and the information relating to the comment for the distributer (avatar object) from the viewer can be transmitted to the server device 20 (the comment API server device 20D).

(7) Studio Unit

A studio unit (not shown) including the video generation unit 100, the display unit 110, the storage unit 120, the user interface unit 130, the gift storage unit 140, and the communication unit 150 can be used as the terminal device 10.

The studio unit can be realized by an information processing device such as a personal computer, and can include mainly a central processing unit, a main storage device, an input/output interface device, an input device, an auxiliary storage device, and an output device, similarly to the terminal device 10 and the server device 20 described above. These devices are connected to each other by a data bus and/or a control bus. Further, the studio unit functions as an information processing device for executing the installed specific application, thereby generating a video including the animation of the avatar object on the basis of data related to the operation of the distributer in a studio room (not shown) in which the studio unit is installed and/or data related to the utterance and singing uttered by the distributer.

Many components of the video generation unit 100 included in the studio unit are arranged in a studio room. In the studio room, the distributer performs various performances, and the studio unit detects the operation, expression, and utterance (including singing) of the distributer.

The distributer is an object for capturing operations, expressions, and utterances (including singing) by various sensor groups included in the studio unit (video generation unit 100). In this case, the distributer does not necessarily need to be a human, and may be, for example, a self-standing robot. The distributer in the studio room may be one, two or more.

The video generation unit 100 in the studio unit can include various motion sensors (not shown) attached to the distributer, a controller (not shown) gripped by a hand of the distributer, and a camera (not shown) attached to the head of the distributer via a mounting tool (not shown). In addition, the studio unit is provided with a microphone in any place (for example, a wall, a floor, a ceiling or the like) in the mounting tool or the studio room in order to acquire the voice data of the distributer. Further, in addition to the above-described configuration, the studio unit can include a plurality of base stations (not shown), a tracking sensor (not shown), and a display (not shown)

The motion sensor can detect the position and orientation of the distributer in cooperation with the base station described above. In one embodiment, the plurality of base stations are a multi-axis laser emitter, and after emitting blinking light for synchronization, one base station scans the laser beam around a vertical axis, for example, and the other base station is configured to scan the laser beam around a horizontal axis, for example. The motion sensor is provided with a plurality of optical sensors for detecting flashing light and laser light from a base station, and can detect the time difference between the incident timing of the blinking light and the incident timing of the laser beam, the light receiving time of each optical sensor, the incident angle of the laser beam detected by each optical sensor, and the like. The motion sensor may be, for example, Vive Tracker provided from HTC Corporation, or Xsens MVN Analyze provided from ZERO C SEVEN Inc.

A video generation unit 100 in the studio unit acquires detection information indicating the position and orientation of each motion sensor calculated by the motion sensor. The motion sensor can detect the movement of the body of the distributer by detecting the position and the direction of the motion sensor by being mounted on a site such as the wrist, the instep, the waist, the head top, etc. of the distributer.

In one embodiment, a plurality of infrared LEDs are mounted on a plurality of motion sensors, and light from the infrared LEDs is detected by an infrared camera provided on a floor or a wall of a studio room, so that the position and orientation of the motion sensor may be detected. A visible light LED may be used instead of the infrared LED, and the position and orientation of the motion sensor may be detected by detecting light from the visible light LED by a visible light camera.

In one embodiment, a plurality of reflection markers can be used instead of the motion sensor. The reflection marker is stuck to a distributer by an adhesive tape or the like. The position and the direction of the reflection marker may be detected by photographing the distributer to which the reflection marker is stuck in this way, generating photographing data, and performing image processing of the photographing data.

The controller outputs a control signal corresponding to the operation of the distributer, and the video generation unit 100 acquires the control signal The tracking sensor generates tracking information for determining setting information of a virtual camera for constructing a virtual space included in a video. The tracking information is calculated as a position in a three-dimensional orthogonal coordinate system and an angle around each axis, and a video generation unit 100 acquires the tracking information A camera attached to the head of the distributer is arranged so as to capture an image of the face of the distributer. The camera acquires imaging data of the face of the distributer by continuously imaging the face of the distributer, and a video generation unit 100 acquires the imaging data from the camera. The camera may be a 3D camera capable of detecting the depth of the face of the distributer.

The display functions as a display unit 110, is arranged at a position visible by a distributer, and the distributer can acquire various kinds of information and visually recognize the video generated by the video generation unit 100 through a display.

In addition to the components described above, the studio unit similarly includes the storage unit 120, the user interface unit 130, the gift storage unit 140, and the communication unit 150 described above. Further, constituent elements of the studio unit described as described above can be an example, and may include various components that can be applied to other studio units.

3-2. Function of Server Device 20

Figures 4, 5:
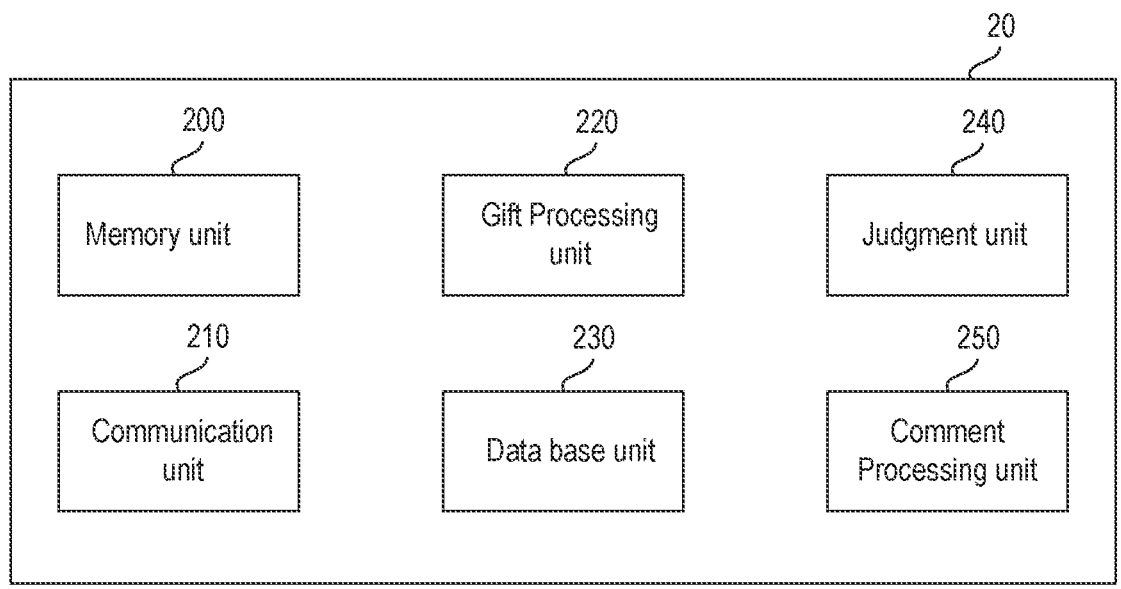
FIG. 4 is a block diagram schematically showing an example of the function of the server device shown in FIG. 1.
FIG. 5 is a diagram showing an example of a table managed by the database unit.

An example of the function of the server device 20 will be described with reference to FIGS. 4 to 7. FIG. 4 is a block diagram schematically showing an example of the function of the server device 20 shown in FIG. 1. FIG. 5 is a diagram illustrating an example of a table managed by the database unit 230. FIGS. 6A to 6D are diagrams illustrating an example of a table managed by the database unit 230, and is a diagram schematically showing an image when the determination unit 240 determines. FIG. 7 is a diagram illustrating an example of a confirmation screen displayed on the display unit 110 of the terminal device 10 of the distributer.

As shown in FIG. 4, the server device 20 mainly includes a storage unit 200, a communication unit 210, a gift processing unit 220, a database unit 230, a determination unit 240, and a comment processing unit 250

(1) Storage Unit 200

A storage unit 200 can store various information required for distribution and/or viewing of a video (including a video including an animation in a state in which a first gift or a second gift is attached to a fitted portion of the avatar object).

(2) Communication Unit 210

The communication unit 210 can communicate, between the terminal device 10 of the distributer and/or the terminal device 10 of the viewer, various information required for distribution and/or viewing of a video (including a video including an animation in a state in which the first gift or the second gift is attached to the fitted portion of the avatar object). For example, the communication unit 210 can receive, from the terminal device 10 of the distributer, a video (including a video including an animation in a state in which the first gift or the second gift is attached to the fitted portion of the avatar object), and distribute it to the terminal device 10 of each viewer.

In addition, the communication unit 210 receives, from the viewer's terminal device 10, information relating to the gifting to be distributed to the distributer (avatar object) from the viewer, and information pertaining to the comment for the distributer (avatar object) from the viewer, and the information relating to the gifting is output to the gift processing unit 220, and the information relating to the comment is output to the comment processing unit 250.

Furthermore, the communication unit 210 can transmit, to the terminal device 10 of the distributer, request information for generating a video including an animation in a state in which the first gift or the second gift is attached to the fitted portion of the avatar object.

In addition, when a plurality of guests are made from the viewer and it is determined that a combination of the first gift satisfies a predetermined condition by a determination unit 240 described later, a request signal related to an inquiry (confirmation) for obtaining confirmation of the distributer is transmitted to the terminal device 10 of the distributer, and information related to an answer to the inquiry can be received from the terminal device 10 of the distributer.

(3) Gift Processing Unit 220

When the communication unit 210 outputs information relating to gifting (a request signal relating to gifting), the gift processing unit 220 reads out at least identification information (a serial number of the terminal device 10 of each viewer and ID information to be given to each viewer) of the viewer to which the gifting act is performed, gift information for the gifting (information relating to for which fitted portion of the avatar object, what types of gift, which is identification information such as a name, shape, or color of each gift), and the identification information of the distributer as the avatar associated with the gifting (the serial number of the terminal device 10 of the distributer or the ID information given to the distributer). Further, the gift processing unit 220 automatically stores the read information in the database unit 230 according to the inquiry.

(4) Database Unit (Database) 230

The database unit 230 can receive the various kinds of information read by the gift processing unit 220 automatically or at a prescribed time interval to the gift processing unit 220 to receive the information from the gift processing unit 220. As shown in FIG. 5, the database unit 230 has a table (reference table) for each distributer, and stores various kinds of information received from the gift processing unit 220 in each table of the corresponding distributers.

Next, an example of information stored in the table will be described with reference to FIG. 5.

When the database unit 230 has a table 500 for each distributer, identification information 501 (for example, ID information of a distributer) of the distributer is given to each table 500. Further, in accordance with the identification information 501 of the distributer received from the gift processing unit 220, the database unit 230 sequentially stores the gifted gift information in the corresponding table (in FIG. 5), but stores, for example, the avatar object in the order of mounting the first gift.

More specifically, it is assumed that, from a state (initial state) in which a gift is not mounted at all at the fitted portion of the avatar object (initial state), it is assumed that the gifting related to the first gift are executed from one or a plurality of viewers in the order of a "red randsel backpack", a "diamond crown", a "silver fork", a "golden paper fan", a "gold ring", and a "white sneaker" as shown in FIG. 5. In this case, each first gift is mounted in the order of attachment of the avatar object (a video including an animation in which a first gift is attached to a fitted portion of the avatar object). Therefore, in the table 500, the database unit 230 stores a "red randsel backpack", a "diamond crown", a "silver fork", a "golden paper fan", a "gold ring", and a "white sneaker" in the box 502 of the "equipped gift list" in this order (the order in which they are gifted or mounted). Although not described in FIG. 5, the database unit 230 may store (display) the information ("back") related to the fitted portion of the avatar object corresponding to each first gift ("back") and the identification information (for example, the ID information of the viewer) of the viewer who has made the first gift to be stored (displayed) in the box 502 so as to correspond to each first gift.

Next, from a state in which the six first gifts are respectively attached to the fitted portion of the avatar object, it is assumed that, in the order of "diamond crown", "silver fork", "silver ring", "copper knife", "black backpack", "white randsel backpack", "gold fork", "gold glasses", and "silver spoon", it is assumed that the gifting related to the first gift are further executed from one or more viewers. In this case, the above six first gifts are already attached to the fitted portion of the avatar object corresponding to these gifts. That is, the "red randsel backpack" on the "back", the "diamond crown" on the "head", the "silver fork" on the "left hand", the "golden paper fan" on the "right hand", the "gold ring" on the "fingers", and the "white sneakers" on "both feet". In this state, when further gifting are executed (such as the "black backpack" for the "back" and the "silver ring" for the "fingers"), a plurality of first gifts are overlapped at a corresponding fitted portion. In such a case, the database unit 230 stores at least temporarily, in the box 503 of the "unequipped gift list" in the order of gifting of the first gifts. In this case, similarly to the box 502, the database unit 230 May store (display) the information related to the fitted portion of the corresponding avatar object and the identification information of the viewer who has received each first gift in the box 503 so as to correspond to each first gift.

It can be said that, on the basis of the information stored as described above, the database unit 230 stores the type of the first gift imparted to the fitted portion of the avatar object and the number of application for each type of the first gift in association with each other. In other words, the database unit 230 manages (stores) how many types of first gifts have been imparted for each fitted portion, using the table 500, and the information to be managed (stored) is also output to the determination unit 240 in accordance with the inquiry from the determination unit 240.

The first gift mounted on the avatar object is set in advance in the video distribution application and the video viewing application so that the first gift mounted on the avatar object is automatically erased from the video when a predetermined time elapses (for example, one minute or two minutes). Therefore, if a "black backpack" is gifted after a predetermined time has elapsed since the "red randsel backpack" is attached to the avatar object, the "black backpack" is attached to the avatar object (in this case, the database unit 230 stores "black backpack" in the box 502).

(5) Determination Unit 240

The determination unit 240 determines whether or not to generate a video including an animation in a state in which a second gift having a feature common to the first gift is attached to the fitted portion of the avatar object when there is a plurality of gifting actions by a plurality of gifting actions (including both of a plurality of gifting actions by a plurality of viewers). This determination is executed (based on the information outputted from the database unit 230) by referring to the table 500 managed by the database unit 230. Specifically, the determination is executed on the basis of whether the combination of the plurality of first gifts satisfies a predetermined condition preset in the video distribution application and the video viewing application.

An example of the determination will be described with reference to FIGS. 6A to 6D.

As described above with reference to FIG. 5, when attention is paid to the "head" among the fitted portions of the avatar object, a "diamond crown" is already mounted. In this state, in a case where a "diamond crown" is further gifted, the combination of the first gift is the two same gifts (see FIG. 6A). Here, when at least one of the above-mentioned predetermined conditions is "the same first gift is aligned", it satisfies the predetermined condition described above. Such a predetermined condition can be arbitrarily set in the video distribution application and the video viewing application in advance. When a predetermined condition is satisfied in this way, the determination unit 240 determines to generate a video including an animation in a state in which a second gift having a characteristic common to a "diamond crown" which is a first gift is attached in the "head" of the avatar object. As the second gift in this case, for example, the size, the color, and/or at least a part of the shape of the first gift, such as the "large diamond crown" or the "100 carat diamond tiara", can be appropriately adopted.

Next, as described above with reference to FIG. 5, when attention is paid to the "finger", a "gold ring" is already attached to the "finger" among the fitted portions of the avatar object. In this state, when a "silver ring" is further gifted, the combination of the first gift is referred to as a "gold ring" and a "silver ring" (see FIG. 6B). Here, in the case where at least one of the predetermined conditions described above is "the two first gifts having different colors only are aligned", the combination satisfies a predetermined condition. When a predetermined condition is satisfied in this way, the determination unit 240 determines to generate a video including an animation in a state in which a second gift such as a "diamond ring" having a characteristic common to the "gold ring" as the first gift is attached, as in the case described with reference to FIG. 6A.

Next, as described above with reference to FIG. 5, when attention is paid to the "back" among the fitted portions of the avatar object, the "red randsel backpack" is already mounted. In this state, in a case where "black backpack" and "white randsel backpack" are gifted, the combination of the first gift consists of three combinations of "red randsel backpack", "black backpack" and "white randsel backpack".

Figure 6A:
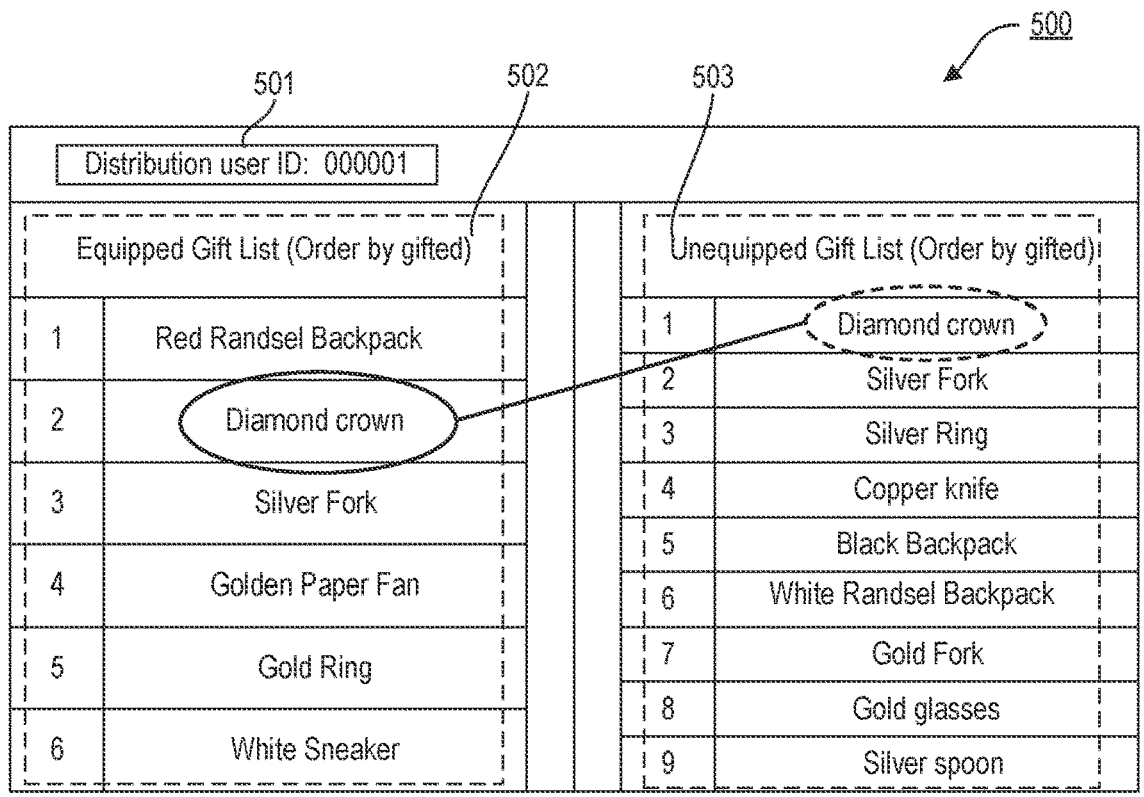
FIG. 6A is a diagram illustrating an example of a table managed by the database unit, and is a diagram schematically showing an image when a determination unit determines.
Figure 6B:
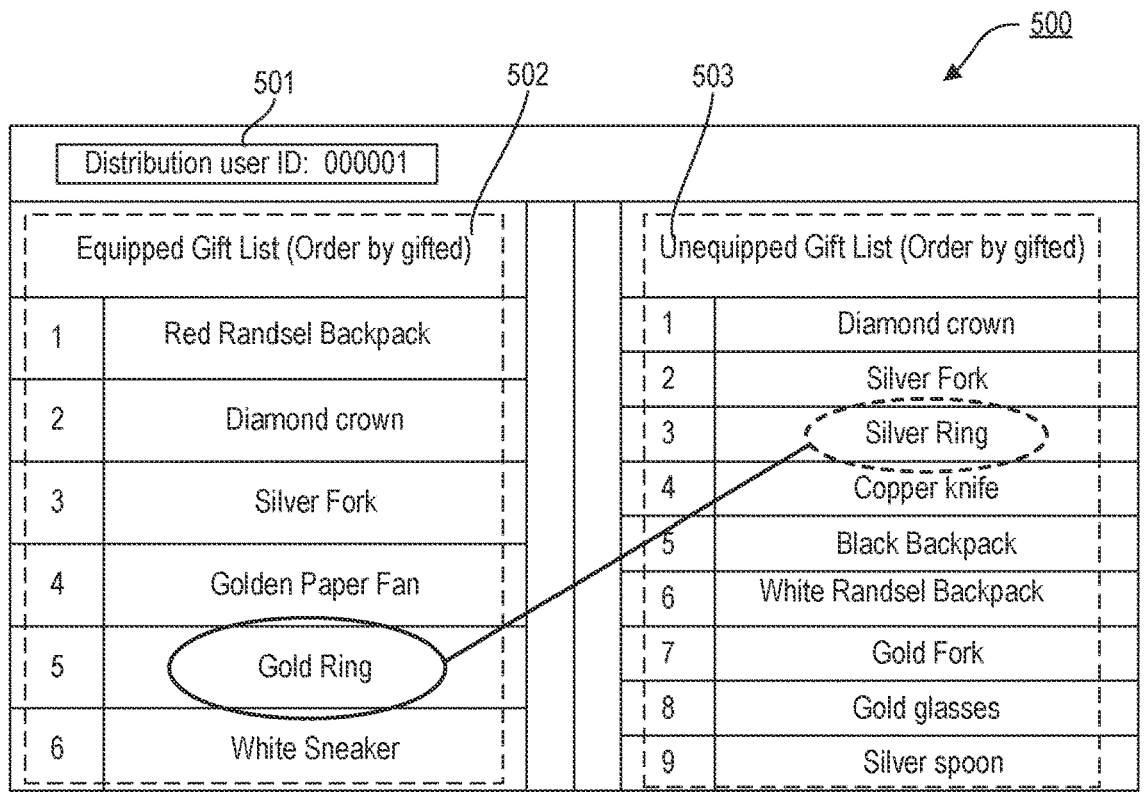
FIG. 6B is a diagram illustrating an example of a table managed by the database unit, and is a diagram schematically showing an image when a determination unit determines.
Figure 7:
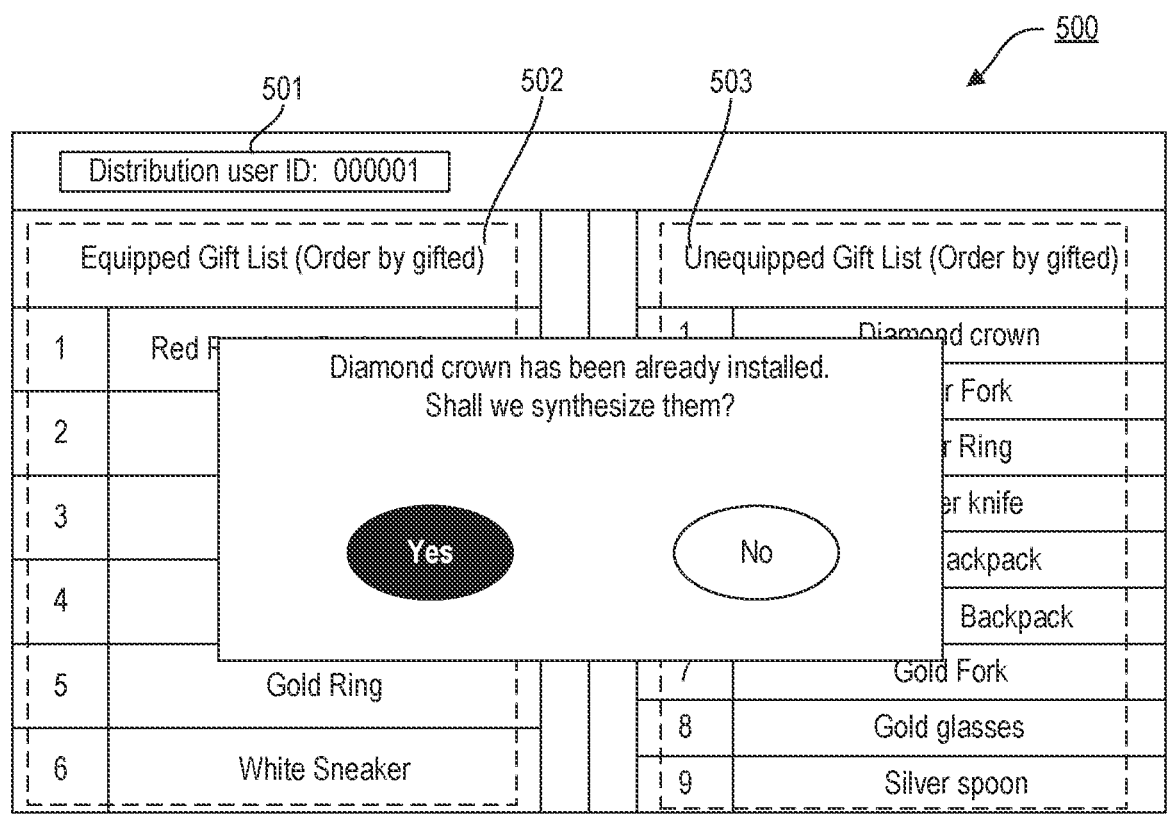
FIG. 7 is a diagram illustrating an example of a confirmation screen displayed on a display unit of a terminal device of a distributer.

(see FIG. 6C). In this case, when at least one of the predetermined conditions is "three pieces of first gift on the back", the combination satisfies a predetermined condition. When a predetermined condition is satisfied in this way, the determination unit 240 determines to generate a video including an animation in a state in which a second gift having a characteristic common to the "red randsel backpack" as the first gift is attached, similarly to the case described with reference to FIG. 6A. As the second gift in this case, for example, a "large wing" or the like is set. In this way, the "second gift may have a characteristic common to the first gift" only by sharing the fitted portion of the first gift and the second gift. Also the second gift may be the same color, size, and kind as the first gift may be addressed by setting the "second gift may have a characteristic common to the first gift".

Next, as described above with reference to FIG. 5, when attention is paid to the "left hand" among the fitted portions of the avatar object, the "silver fork" is already mounted. In this state, when the "silver fork", the "copper knife", the "gold fork", and the "silver spoon" are gifted, the combination of the first gift is a total of five combinations of two "silver forks", "copper knife", "gold fork" and "silver spoon". (see FIG. 6D). Here, when at least one of the above-mentioned predetermined conditions is "gold, silver, or copper color and knife, fork, or spoon on the 'left hand'", the combination satisfies the predetermined condition. When a predetermined condition is satisfied in this way, the determination unit 240 determines that a video including an animation in a state in which a second gift having a characteristic common to the "silver fork" of the first gift is attached is generated, as in the case described with reference to FIG. 6A. As the second gift in this case, for example, a "large fork with rainbow color" or the like may be set.

As in the above example, any predetermined condition described can be set. If the predetermined condition is a plain one (for example, an example described with reference to FIG. 6A or FIG. 6B), many kinds of second gifts can be made to appear, so that it is possible to stimulate the willingness of the gifting by the viewer. On the other hand, even if the predetermined condition is a difficult one (as in the example described with reference to FIG. 6D, etc.), the viewer is caused to have interest and curiosity of how the second gift appears when the first gift is combined. Therefore, it is possible to increase a gifting opportunity by the viewer.

When the combination of the plurality of first gifts does not satisfy a predetermined condition, the determination unit 240 can calculate a necessary condition (the type, the number, and the like of the gift required to satisfy the predetermined condition) necessary for the combination to satisfy the predetermined condition. The determination unit 240 compares the set predetermined condition with the actual combination of the plurality of first gifted first gifts, and calculates a condition that any first gift needs to be further added in order to satisfy the predetermined condition. The calculated necessary condition is outputted to a comment processing unit 250. A specific example of the necessary conditions will now be described. For example, in the above-described case described with reference to FIG. 6C, if the predetermined condition is "three first gifts with respect to the 'back'" as described above, when only the "red randsel backpack" (already equipped) and the "black backpack" are gifted, the necessary condition is "one first gift corresponding to the back of the avatar object". In the case of such a necessary condition, the comment processing unit 250 combines the comment information such as "the gift is changed if there is one gift on the back, for example) into a video (displayed on the video), and is transmitted to the terminal device 10 of the distributer. In addition, as described above with reference to FIG. 6D, the predetermined condition is set to "gold, silver, or copper color and knife, fork, or spoon on the 'left hand'" as described above, the necessary condition is "copper knife corresponding to the left hand of the avatar object". In the case of such a necessary condition, the comment processing unit 250 combines the comment information such as, for example, "seeking a gift of a copper knife!" with the video (combined on the video) and transmits it to the terminal device 10 of the distributer.

When the determination unit 240 determines that the combination of the first gift satisfies a predetermined condition, the determination unit 240 can output a request signal related to an inquiry for obtaining confirmation of the distributer to the communication unit 210, for attaching the second gift to the attachment portion of the avatar object (generating a video including the animation in which the second gift is attached to the attachment portion of the avatar object). The communication unit 210 transmits the request signal to a distributer (terminal device 10 of a distributer), and receives information related to an answer to the inquiry from the terminal device 10 of the distributer. In this case, as an example of the screen 600 as shown in FIG. 7, the screen 600 is displayed on the display unit 110 of the terminal device 10 of the distributer. It should be noted that "combined?" in FIG. 7 can be replaced with "attach the second gift to the avatar object?" It should be noted that, in a case where the distributer is aware of the fact that the second gift is attached to the avatar object (when the distributer selects "Yes" in FIG. 7), it is possible to set to notify the viewer that the gifting is not reflected on the avatar object for a fixed time (the duration described later), and if the viewer further performs gifting to the fitted portion of the avatar object to which the second gift is attached. As a specific example in this case, the determination unit 240 may instruct the comment processing unit 250 to the comment processing unit 250 so that, for example, the comment information such as "not-yet-combined" or "already-second gift mounting" is transmitted to the terminal device 10 of the distributer.

For a second gift attached to the avatar object, a duration (for example, one minute or two minutes) in which a second gift is present in a video including an animation in a state in which a second gift is attached is set in advance in a video. When the duration passes, the second gift is set in the video distribution application and the video viewing application so that the second gift is erased from the video. The duration of the second gift may be a point of time when the second gift is attached to the fitted portion of the avatar object, or may be a point of time when the last gifting time (the time when the predetermined condition is satisfied) executed by the viewer to satisfy the predetermined condition. In addition, it is preferable to cause the gifting action of the viewer at the timing immediately after the second gift is erased from the video, so as to increase the gifting opportunity. Therefore, immediately before the second gift is erased from the video, for example, the determination unit 240 may instruct the comment processing unit 250 to notify the comment processing unit 250 that comment information such as a new gifting recruitment is transmitted to the terminal device 10 of the distributer, for example, immediately before the second gift is erased from the video.

(6) Comment Processing Unit 250

The comment processing unit 250 can receive comment information for the distributer (avatar object) from the viewer from the terminal device 10 of the viewer via the communication unit 210. The comment processing unit 250 can distribute the comment information from the viewer to each viewer viewing the same video.

In addition, the comment processing unit 250 can create comment information corresponding to all or a part of information related to which viewer has made the first gift to the fitted portion of the avatar object by referring to the table 500 managed by the database unit 230. The comment processing unit 250 can distribute the comment information to each viewer viewing the same video.

Further, the comment processing unit 250 can create comment information indicating that the first gift and/or the second gift is imparted to the fitted portion of the avatar object and/or that the second gift is attached to the attachment part of the avatar object by referring to the table 500 managed by the database unit 230. The comment processing unit 250 can distribute the comment information to each viewer who views the same video.

Furthermore, the comment processing unit 250 creates comment information corresponding to the necessary condition calculated by the determination unit, and can distribute the comment information to each viewer viewing the same video.

4. OVERALL OPERATION OF VIDEO DISTRIBUTION SYSTEM

Figure 8:
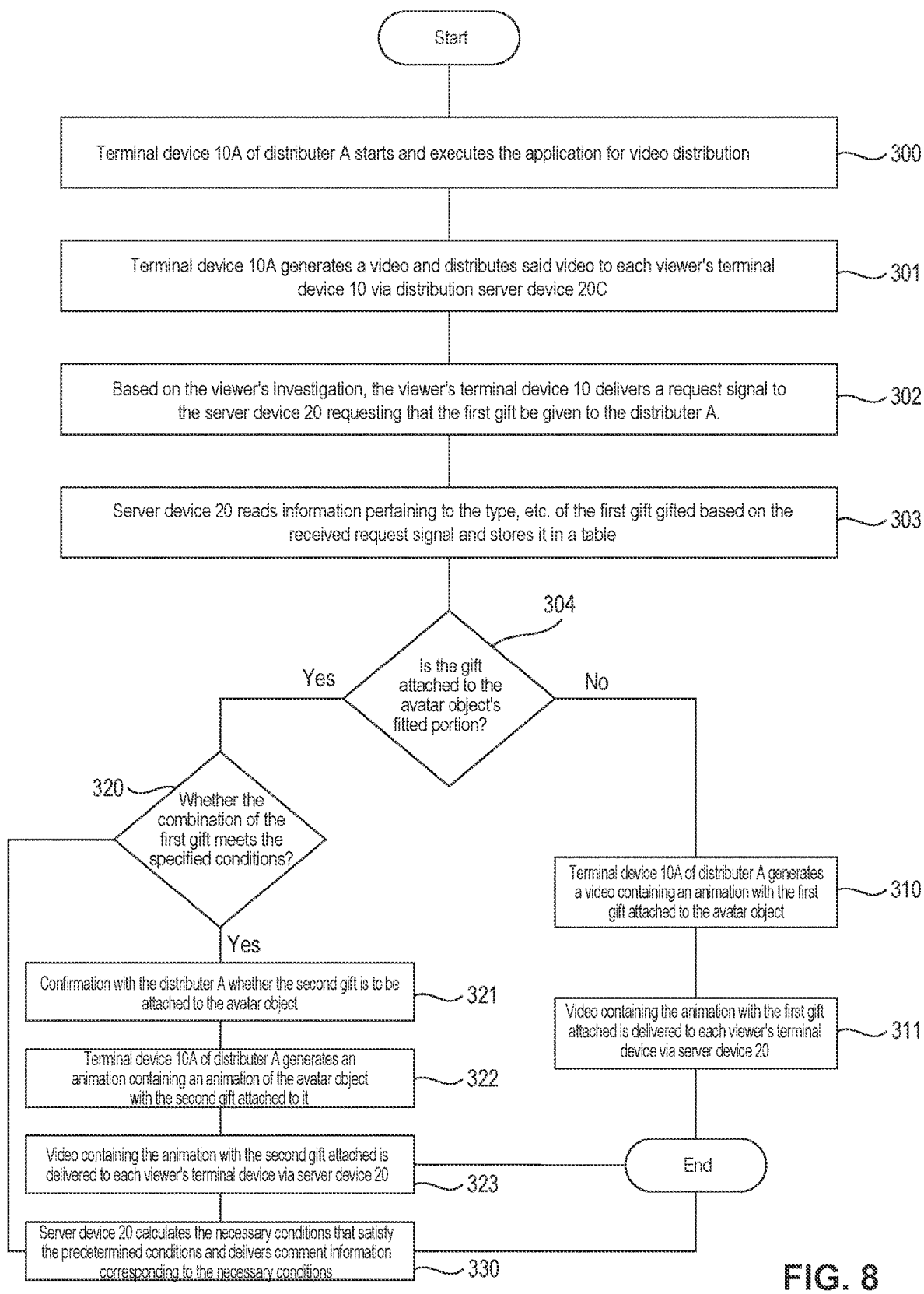
FIG. 8 is a flowchart showing an example of an operation performed in the video distribution system shown in FIG. 1.
Figure 9:
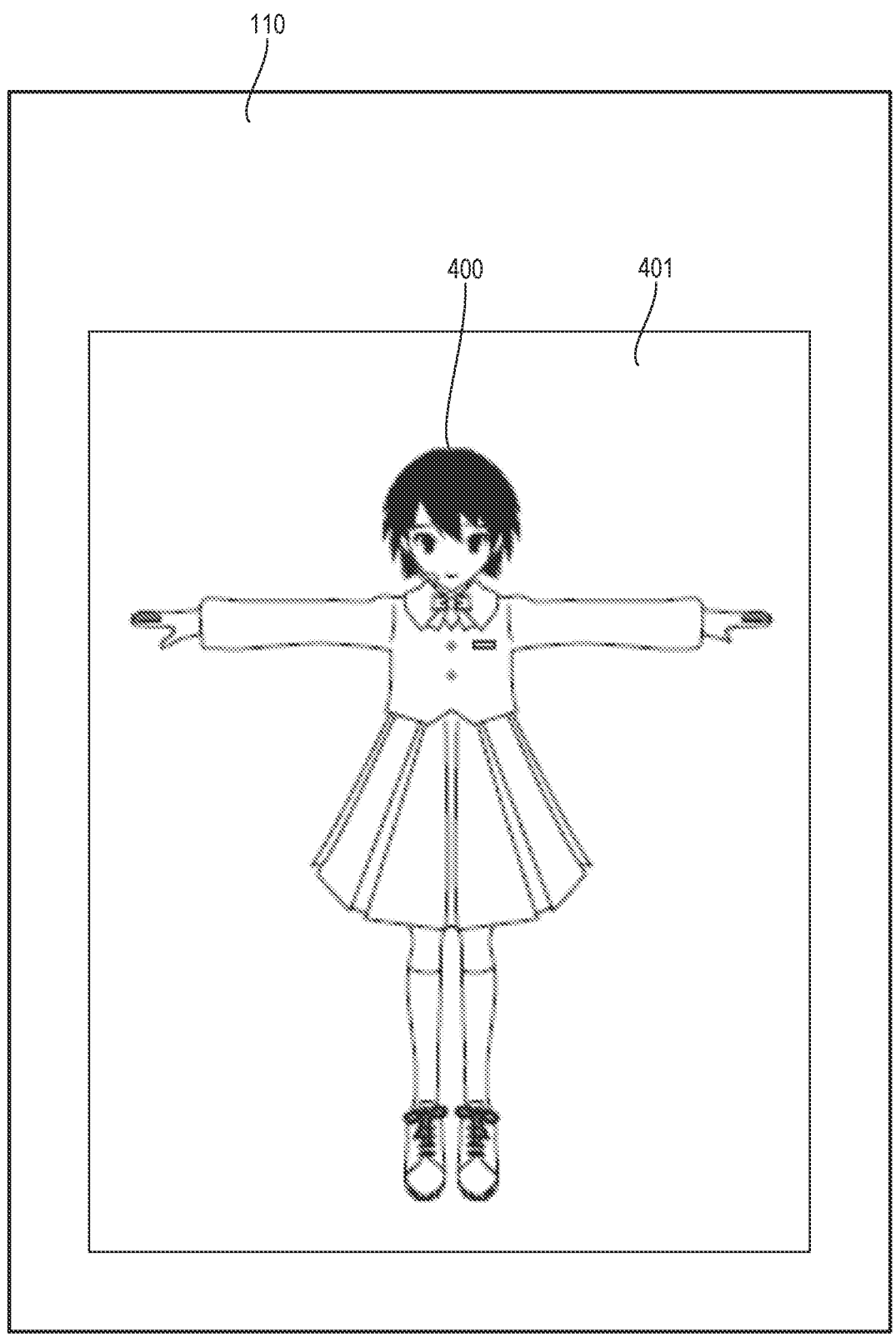
FIG. 9 is a diagram illustrating an example of a video including an animation of an avatar object of a distributer.
Figure 10:
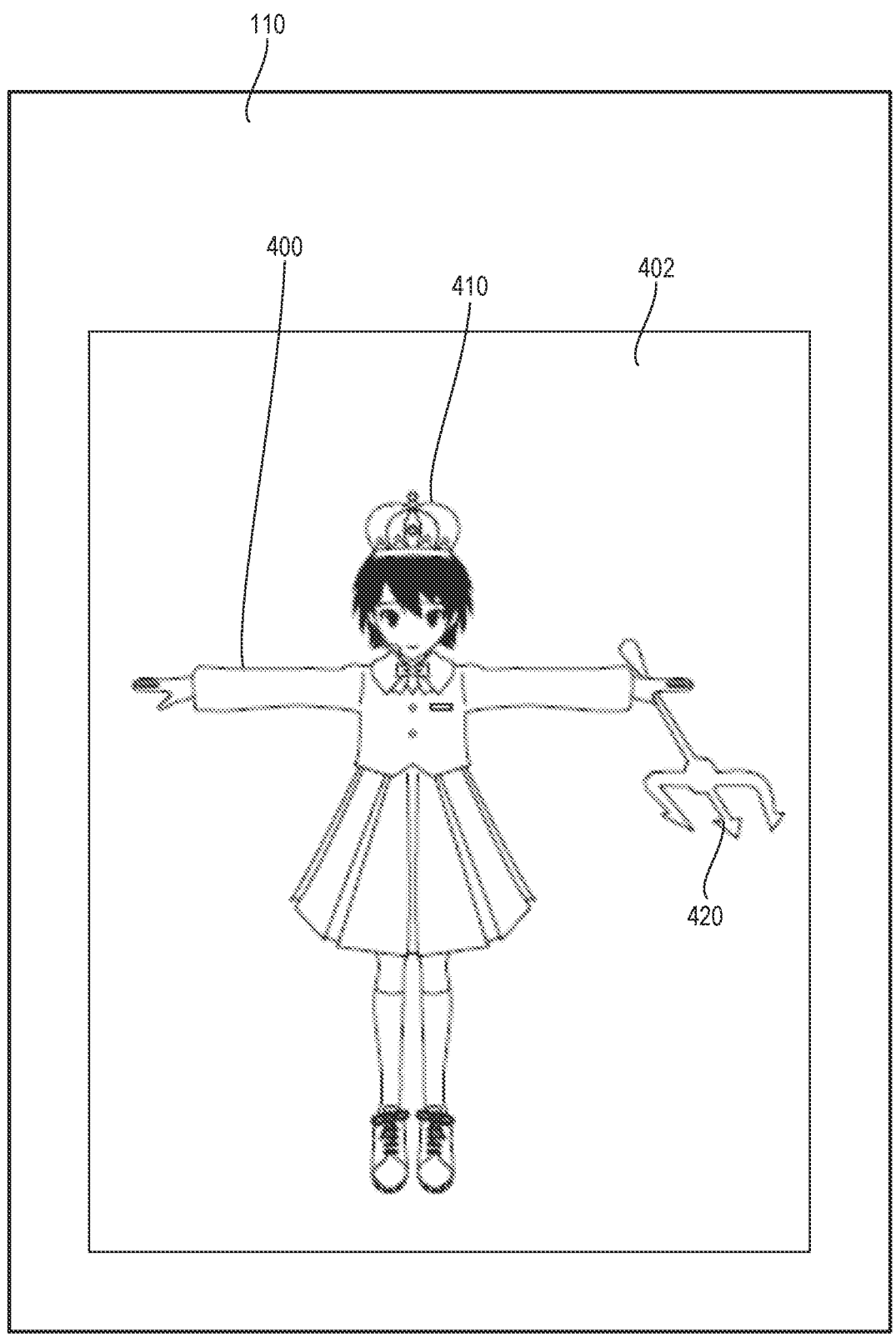
FIG. 10 is a diagram illustrating an example of a video including an animation in a state in which a first gift is attached to a mounting portion of the avatar object of the distributer.
Figure 11:
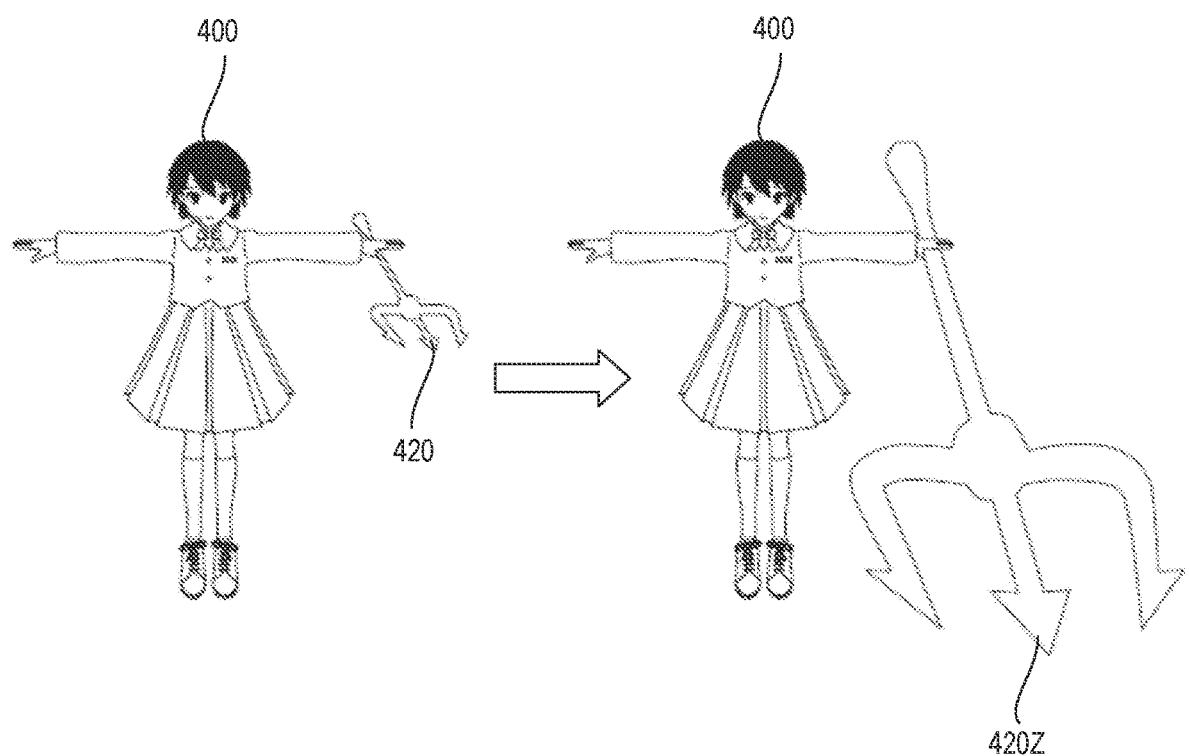
FIG. 11 is a diagram schematically showing an example of an image on which a second gift is attached in place of the first gift in a fitted portion of the avatar object of the distributer.

Next, an overall operation performed in the video distribution system 1 having the above-described configuration will be described with reference to FIGS. 8 to 11. FIG. 8 is a flowchart showing an example of an operation performed in the video distribution system 1 shown in FIG. 1. FIG. 9 is a diagram illustrating an example of a video including an animation of an avatar object of the distributer. FIG. 10 is a diagram illustrating an example of a video including an animation in a state in which a first gift is attached to a fitted portion of an avatar object of a distributer. FIG. 11 is a diagram schematically showing an example of an image on which a second gift is attached in place of the first gift in a fitted portion of the avatar object of the distributer.

First, a step (hereinafter referred to as "ST") 300, according to the operation of the distributer (here, the distributer A), the terminal device 10 (here, the terminal device 10A) activates and executes the video distribution application.

Next, in ST 301, the terminal device 10A generates a video including an animation of an avatar object (first avatar object) of the distributer A on the basis of data related to the operation of the distributer A and/or voice data related to singing and singing uttered by the distributer. Thus, as illustrated in FIG. 9, a video 401 including the animation of the avatar object 400 of the distributer A is displayed on the display unit 110 of the terminal device 10A.

Further, the terminal device 10A transmits the generated video 401 to the distribution server device 20C of the server device 20. The distribution server device 20C distributes the video received from the terminal device 10A to the terminal device 10 of each viewer executing the video viewing application. As a result, the video 401 as illustrated in FIG. 9 is displayed also on the display unit 110 of the terminal device 10 of each viewer.

Next, in ST302, the terminal device 10 of the viewer transmits a request signal for requesting the application of the first gift to the distributer A (the fitted portion of the avatar object 400) to the server device 20 (the gift API server device 20A) on the basis of the operation of the viewer to the user interface unit 130.

Next, in ST303, the server device 20 (gift API server device 20A) receiving the request signal related to the first gift from the terminal device 10 of the viewer reads at least the identification information of the viewer to which the gifting action is performed, the information related to the gifted gift, and the identification information of the distributer as the avatar object of the gifting object. The various kinds of information read out are stored in a table in the information processing server device 20B in the server device 20.

Next, in ST304, the server device 20 (information processing server device 20B) confirms whether or not a first gift has already been attached to each fitted portion of the avatar object 400 of the distributer A when the information is stored in the table in ST303. In ST304, when the fitted portion of the avatar object 400 which has been made to be gifted by the viewer is, for example, a "head" and the information related to the gifting is stored in the table in ST303, the first gift is not attached to the "head". The server device 20 (information processing server device 20B) determines "NO" in ST304. Then, the server device 20 transmits, to the terminal device 10*a* of the distributer A, information for requesting generation of a video including an animation in which a first gift (for example, a "diamond crown") of the avatar object 400 to be viewed from the viewer is attached to the "head" of the avatar object 400 so as to proceed to the ST310.

On the other hand, the server device 20 (the information processing server device 20B) determines "YES" in ST304 if the fitted portion of the avatar object 400 which has been subjected to the gifting by the viewer is, for example, the "head" and the information related to the gifting is stored in the table in ST303, the server device 20 (the information processing server device 20B) determines "YES" in ST304. That is, it is understood that there are a plurality of request signals for imparting a first gift (a diamond crown) to the "head" in this case. Then, the server device 20 proceeds to ST320 to be described later, and executes determination related to a combination of the first gift.

Next, when the server device 20 determines "NO" in ST304 as described above, the terminal device 10*a* of the distributer A receives, from the server device 20 (information processing server device 20B), information for requesting the generation of a video including an animation in which a first gift (for example, a "diamond crown") of the avatar object 400 is attached to the "head" of the avatar object 400. Then, the terminal device 10*a* of the distributer A generates the video in ST310. Thus, as illustrated in FIG. 10, the display unit 110 of the terminal device 10A displays a video 402 including an animation in which a first gift 410 as a "diamond crown" is attached to the "head" of the avatar object 400 of the distributer A. In the video 402 in FIG. 10, an example in which a first gift 420 as a "fork of silver" is attached to the "left hand" of the avatar object 400 is shown in the same step.

Further, the terminal device 10A transmits the generated video 402 to the distribution server device 20C of the server device 20. A distribution server device 20C distributes a video received from a terminal device 10A to a terminal device 10 of each viewer executing the video viewing application in ST311. As a result, the video 402 as illustrated in FIG. 10 is displayed also on the display unit 110 of the terminal device 10 of each viewer. Thus, the step when the server device is determined to be "NO" in ST304 ends.

On the other hand, when the server device 20 determines "YES" in ST304 as described above, the determination unit 240 determines whether or not the combination of the first gift satisfies a predetermined condition in ST320. When the combination of the first gift satisfies a prescribed condition ("YES" in ST320), the server device 20 (the determination unit 240 of the information processing server device 20B) in ST321 transmits information relating to whether or not a second gift may be attached to the avatar object 400 to the distributer A (confirmation) to the terminal device 10A of distributer A. In response to the inquiry, the distributer A can transmit an answer to the effect that the distributer A is OK. When the distributer A transmits the answer (for example, an answer indicating "OK") to the server device 20 from the terminal device 10A of the distributer A, the server device 20 (the information processing server device 20B) transmits, to the terminal device 10A of the distributer A, information for requesting generation of a video including an animation in which a second gift (for example, "100 color diagram") is attached to a fitted portion (for example, "head") of the avatar object 400. A specific example of the second gift is supplemented with reference to FIG. 11. For example, when a first gift 420 as a "silver fork" is attached to the "left hand" of the avatar object 400, if a predetermined condition is satisfied, a second gift 420*z* of a "fork of rainbow color" is generated (combined). In this case, the first gift 420 and the second gift 420*z* are not only common in the fitted portion of the corresponding avatar object 400 but also a shape which is one of the features. In this way, the first gift 420 and the second gift 420Z have some common features.

Next, in ST 322, the terminal device 10A of the distributer A receives, from the server device 20 (information processing server device 20 B), information for requesting the generation of a video including an animation in which a second gift (for example, "100 carat diamond") is attached to the "head" of the avatar object 400. Then, the terminal device 10A generates the video (not shown).

Further, the terminal device 10A transmits the generated video to the distribution server device 20C of the server device 20. A distribution server device 20C distributes a video received from a terminal device 10A to a terminal device 10 of each viewer executing the video viewing application in ST323. Thus, the same video is displayed also on the display unit 110 of the terminal device 10 of each viewer, and when the server device is determined to be "YES" in ST304 and "YES" is determined in ST320, the step is terminated.

In ST320, when the combination of the first gift does not satisfy the predetermined condition ("NO" in ST320), the determination unit 240 of the server device 20 (the information processing server device 20B) calculates, in ST330, a necessary condition (type, number, and the like of a gift required for satisfying a predetermined condition) required for the combination to satisfy the predetermined condition. Further, the calculated necessary condition is converted into comment information and distributed to the terminal device 10 of each viewer through a comment processing unit 250. As a result, similar comment information is displayed also on the display unit 110 of the terminal device 10 of each viewer. In this way, the step when it is determined that "NO" is determined in ST320 is completed.

The above steps are executed every time the viewing action is performed from the viewer. Therefore, the video including the animation in which the first gift or the second gift is mounted can be generated and distributed at a proper time in each fitted portion of the avatar object 400 for every gifting action.

5. MODIFICATION EXAMPLE

5-1. First Modification Example

In the above-described embodiment, the generation of a video (including a video including an animation in a state in which the first gift or the second gift is attached) is executed by the terminal device 10 of the distributer, but in the first modification, for example, the server device 20 or the terminal device 10 of the viewer may be executed. In addition, each of the terminal device 10 of the distributer, the server device 20, and the terminal device 10 of the viewer may generate a part of the video to generate a final video, or a device other than these devices may further generate a part of the video. In the first modification, a rendering unit (not shown) may be provided in the server device 20 and/or the terminal device 10 of the viewer, and the server device 20 and/or the terminal device 10 of the viewer may generate a video (including a video including an animation in a state in which the first gift or the second gift is attached to the fitted portion of the avatar object). In this case, the terminal device 10 of the distributer generates only data related to the operation of the distributer and/or data related to the singing, in addition to the information related to the first gift and the information related to the second gift, for example. The terminal device 10 of the distributer may transmit the data to the server device 20 and/or the terminal device 10 of the viewer.

In order to achieve such a configuration, each function of the server device 20, the terminal device 10 of the viewer, and the terminal device 10 of the distributer in the first modification is appropriately changed from the above-described embodiment. For example, in one embodiment, the video generation unit 100 is provided in the terminal device 10 of the distributer, but may be provided in the server device 20 or the terminal device 10 of the viewer.

The determination regarding whether or not the combination of the first gift satisfies a predetermined condition by referring to the table 500 for storing the gift information and the table 500 is executed by the information processing server device 20B in the server device 20 in the embodiment described above. However, in the first modification, however, it may be executed by the terminal device 10 of the distributer. As a result, in the above-described embodiment, the determination unit 240 is provided in the server device 20, but the determination unit 240 May be provided in the terminal device 10 of the distributer.

Furthermore, in the above-described embodiment, it is determined whether or not the combination satisfies a predetermined condition on the basis of a first gift combination (for example, a combination of a first gift to be given to a "head") given to each of the attachment portions of the avatar object. In the first modification, for example, it may be determined whether or not the combination satisfies a predetermined condition on the basis of a combination of a plurality of first gifts applied to a plurality of attachment portions of the avatar object. Specifically, the combination of the first gift given to the "head" of the avatar object and the first gift given to the "neck", the first gift given to the "left hand" of the avatar object, the first gift given to the "right foot", the first gift given to the "left foot", and the first gift imparted to the "right foot" may be used.

Further, the predetermined condition may be set so as to change every predetermined time (for example, every day, every week, every month, month) in the first modification.

Further, as described with reference to FIG. 11 in the embodiment described above, the second gift may be set so that a predetermined gift may be combined in accordance with a preset first gift combination. However, in the first modification example, a plurality of types of second gifts may be combined in accordance with a preset first gift combination, and the second gift selected by the distributer may be set to be attached to the avatar object from among the plurality of types of second gifts.

5-2. Second Modification Example

In one embodiment, a video generation unit 100 of a terminal device 10 of a distributer generates a video including an animation of an avatar object (first avatar object) of the distributer on the basis of data related to an operation of the distributer and/or voice data related to utterance and singing, but is not limited thereto. Specifically, in the second modification, the video generation unit 100 May generate a video including an animation of an avatar object (a second avatar object) relating to a game generated on the basis of an operation and/or an operation of the distributer. The video is distributed to the terminal device 10 of each viewer via the server device 20, as in the embodiment. The second modification example and the above-described embodiment are different in the video (animation related to the video) generated by the video generation unit 100, but the basic functions of the terminal device 10 of the distributer, the server device 20, and the terminal device 10 of the viewer are the same.

In this case, the video generation unit 100 can acquire data relating to the operation of the face of the distributer, the hands, and the like (the whole body) from the acquisition unit described in the above-described embodiment. The video generation unit 100 can also acquire data relating to various operations input by the distributer via the user interface unit 130.

The processing unit in the video generation unit 100 generates, on the basis of data relating to the operation of the distributer acquired from the acquisition unit and/or data relating to the operation of the distributer acquired from the user interface unit 130, a video including a game animation in which the avatar object (second avatar object) of the distributer is an own game object. When generating the video, a video distribution application is executed to the terminal device 10 of the distributer. The video distribution application includes a game program for executing the game.

Here, the second avatar object which is the own game object can include, for example, a character imitating a human, an animal, or the like, a vehicle such as an airplane and a vehicle, or the like, without being limited.

The viewer in the second modification can transmit, to the server device 20, a request signal for requesting the provision of the first gift to the second avatar object (game object) of the distributer via the user interface unit 130 in the terminal device 10 of the viewer, as in the first embodiment.

Similarly to the first embodiment, the video generation unit 100 in the second modification receives, from the server device 20, request information indicating that a video including an animation relating to a second avatar object to which the first gift has been imparted is generated when the second avatar object (game object) is subjected to a gifting relating to the first gift from the viewer. The video generation unit 100 generates the video on the basis of the request information.

In a case where the second avatar object is any character, similarly to the first embodiment, a video in which a first gift is attached to a fitted portion of the second avatar object is generated. On the other hand, when the second avatar object is, for example, a "battle machine", a shooting table or the like for shooting a built-in engine, missile, or the like is included in addition to the left wing, the right wing, the tail wing, or the like as the fitted portion.

In addition, a first gift to be geared to a second avatar object as a game object is not limited to a fitted portion of the second avatar object. For example, the second avatar object may not be actually (physically) mounted, and may be, for example, "another game object" as an ally character for supporting the second avatar object, and a "life" of the second avatar object (the remaining number of the second avatar object on the game).

The video generation unit 100 in the second modification receives, from the server device 20, request information for generating a video including an animation relating to a second avatar object (game object) to which a second gift is imparted, as in the first embodiment. The video generation unit (100) generates the video on the basis of the request information.

As in the case of the first gift, the second gift in this case is not limited to one which can be mounted on the fitted portion of the second avatar object. For example, the second avatar object may be in a form that is not actually (physically) mounted, or may be "another game object" or a "life" described above.

Also in the second modification, the determination unit 240 in the server device 20 determines whether to generate a video including the animation of the second avatar object to which the second gift is imparted, as in the first embodiment. This determination is performed with reference to a table 500 in a table (one embodiment) managed by a database unit 230. Specifically, the determination is executed on the basis of whether or not the combination of the plurality of first gifts satisfies a predetermined condition preset in the video distribution application and the video viewing application.

In the second modification, the determination performed by the determination unit 240 is the same as that of the first embodiment described above. Specifically, for example, a state in which the "ally character A" as "another game object" is already given as a first gift (reflected on the video) is assumed for the second avatar object. In this state, when another "ally character B" is further geared, the combination of the first gifts is that the "ally character" is two. Here, if at least one of the predetermined conditions is "an ally character" is aligned, the above-described state satisfies a predetermined condition. When a predetermined condition is satisfied in this way, the determination unit 240 determines that a second gift having a characteristic common to the "ally character A" and the "ally character B" as the first gift is imparted to the second avatar object to the second avatar object. The second gift in this case can be, for example, an "ally character C" having a characteristic common to the first gift at a point of the second avatar object. The "ally character C" may be apparently different from the "ally character A" and the "ally character B", or any one of the sizes, colors, and/or at least a part of the shape may be changed.

As described above, the second modification can be in the form of following the basic functions of the terminal device 10, the server device 20, and the terminal device 10 of the viewer in one embodiment. It should be noted that the second modification example can also be executed in any form described in the first modified example.

5-3. Third Modification Example

In the above-described embodiment, a video generation unit 100 of a terminal device 10 of a distributer has been described to generate a video including an animation of an avatar object (first avatar object) of the distributer on the basis of data related to an operation of the distributer and/or voice data related to utterance and singing by the distributer.

In the second modification described above, the video generation unit 100 of the terminal device 10 of the distributer is described to generate a video including an animation of an avatar object (a second avatar object) relating to a game generated on the basis of an operation or an operation of the distributer. In the third modification, the video generation unit 100 of the terminal device 10 of the distributer can generate both a video including an animation of the first avatar object in one embodiment and a video including an animation of the second avatar object in the second modified example.

Figure 12:
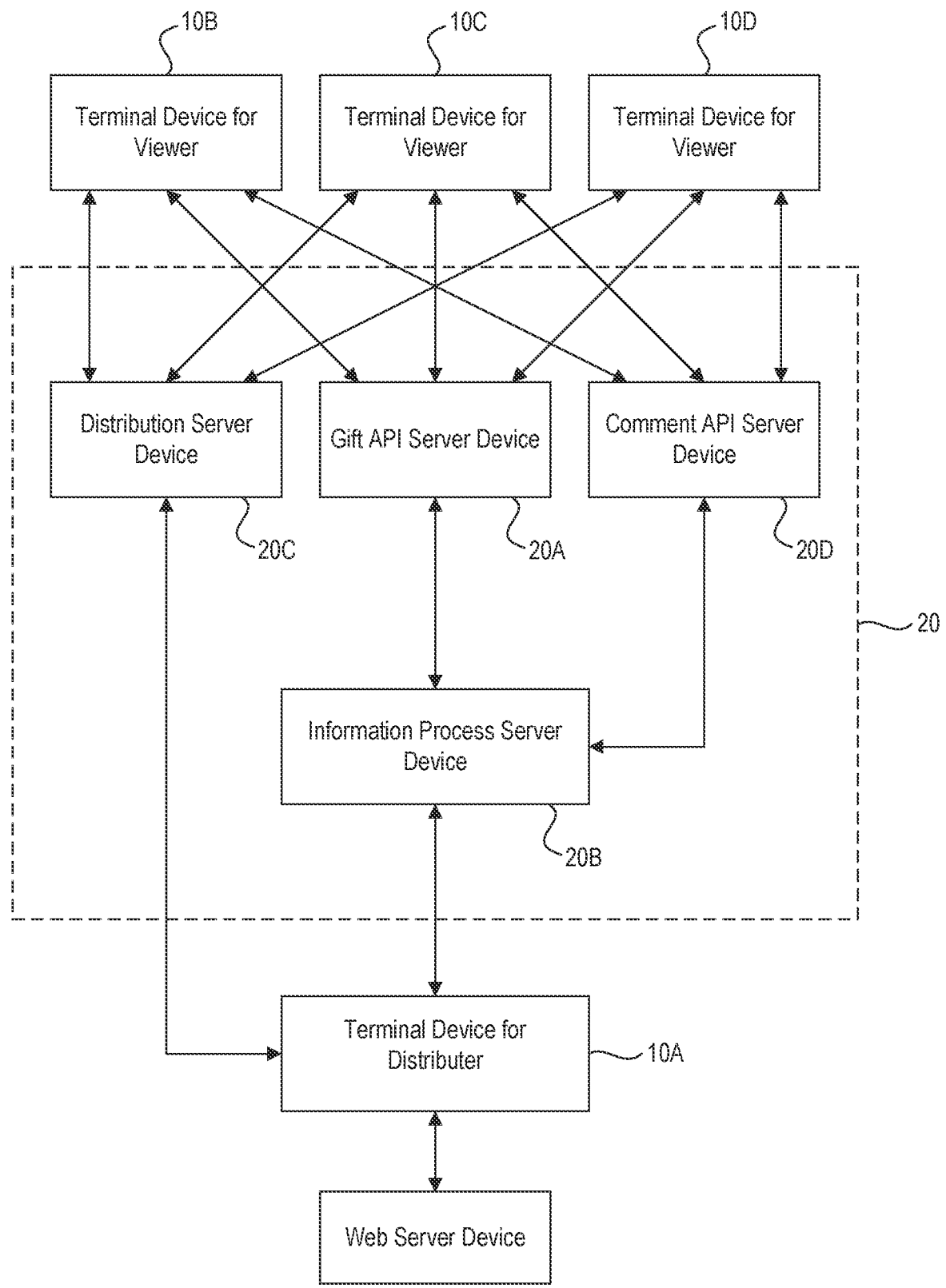
FIG. 12 is a block diagram showing an example of a configuration of a video distribution system according to a third modified example.

In the third modification, the basic functions of the terminal device 10 of the distributer, the server device 20, and the terminal device 10 of the viewer are basically the same as those of the first embodiment and the second modification example With reference to FIG. 12, the configuration of the video distribution system 2 in the third modification will be described. FIG. 12 is a block diagram illustrating an example of the configuration of the video distribution system 2 according to the third modification.

The video distribution system 2 in the third modification is completely the same as the video distribution system 1 in one embodiment except for separately providing the web server device 1000.

In the third modification, the terminal device 10 A can receive a Web page (HTML document) from the web server device 1000 by executing a browser function incorporated in the installed video distribution application and/or by executing the installed web browser application in the terminal device 10 (FIG. 12) of the distributer. The terminal device 10 of the distributer can execute the game program included in the web page. A terminal device 10 of a distributer can generate a video including an animation of a second avatar object related to a game generated on the basis of an operation of a distributer by executing the game program.

The web server device 1000 can transmit a web page (HTML, for example, a document created according to HTML5) in which the game program is incorporated, to the terminal device 10 of each distributer accessing via the communication line. The game program causes the terminal device 10 to execute an operation or an operation for executing a game and an operation for transmitting the game screen generated accompanying the execution of the game to the server device 20 by being executed by the terminal device 10 which has been received and decoded.

In the third modification, the terminal device 10 of the distributer refers to a video including an animation of the first avatar object in one embodiment (hereinafter, referred to as a "first video"). A video including an animation of the second avatar object in the second modification example is referred to as a "second video". Both of the first video and the second video are generated by the selection of the distributer, and the second video is generated at another time. For the selection of the distributer, for example, a method for setting in advance an icon for determining which of the first video or the second video is to be distributed can be used for the display unit 110 in the terminal device 10 of the distributer. The distributer can determine a video to be distributed (a first video or a second video) by operating the icon (operation via the user interface unit 130).

The viewer can perform gifting according to the video distributed from the terminal device 10 of the distributer via the server device 20. In other words, in the case where the first video is distributed, the first avatar object is geared with the first avatar object. On the other hand, when the second video is distributed, the second avatar object is gifted.

As described above, in the third modification, since the video generation unit 100 distributes two of the first video and the second video to the terminal device 10 of the viewer via the server device 20, the video generation unit 100 reads out information related to the first gift from the viewer, the type of the first gift to be executed by the server device 20, and the like, and all the videos are managed for each video in determination or the like executed by the determination unit 240.

6. EFFECT ACCORDING TO VARIOUS EMBODIMENTS

As described above, according to various embodiments including the first embodiment, the first modification, the second modification, and the third modification, it is possible to provide a video processing method, a server device, and a computer program for increasing a gifting opportunity by a viewer.

7. VARIOUS ASPECTS

A video processing method according to the first aspect is executed by one or a plurality of processors for executing an instruction readable by a computer. The video processing method includes: a reception step of receiving a request signal generated on the basis of an operation of a viewer viewing a video including an animation of an avatar object of the distributer; and a generation step of generating the video including an animation in which a second gift having a feature common to the first gift is attached to the avatar object when it is determined that the combination of the plurality of first gifts imparted to the avatar object satisfies a predetermined condition on the basis of the plurality of request signals.

In the video processing method according to the second aspect, in the first aspect, the avatar object is a first avatar object generated on the basis of an operation of the distributer.

In the video processing method according to the third aspect, in the first aspect, the avatar object is a second avatar object related to a game generated on the basis of the operation or operation of the distributer.

In the video processing method according to the fourth aspect, "the second gift" in the first aspect is that the size, the color and/or at least a part of the shape of the first gift are changed.

A video processing method according to the fifth aspect further includes a step of transmitting, to a terminal device of a plurality of viewers, comment information indicating a necessary condition for the combination satisfying the predetermined condition when the combination of the plurality of first gifts does not satisfy a predetermined condition in the first mode.

A video processing method according to the sixth aspect further includes a step of transmitting, to a terminal device of a plurality of viewers, comment information indicating that the first gift is imparted to the avatar object and/or that the first gift is attached to the avatar object in response to the request signal received from a terminal device of a certain viewer in the first mode.

In the video processing method according to the seventh aspect, the determination regarding whether or not the combination satisfies the predetermined condition in the first mode is performed on the basis of a reference table for storing the type of the first gift imparted to the avatar object and the number of application for each type of the first gift in association with each other.

The video processing method according to the eighth aspect further includes a step of setting a duration of continuing the second gift in the video when the combination satisfies the predetermined condition in the first mode, and deleting the second gift from the video when the duration elapses.

In the video processing method according to the ninth aspect, in the first aspect, the reception step and the generation step are executed by a server device connected to a terminal device of the viewer and/or a terminal device of the distributer via a communication line.

In the video processing method according to the tenth aspect, it is determined by the server device that the combination satisfies the predetermined condition in the ninth aspect.

In the video processing method according to the eleventh aspect, the generation step is executed by the terminal device of the distributer in the first mode.

In the video processing method according to the twelfth aspect, when the combination satisfies the predetermined condition in the eleventh aspect, it is determined by a terminal device of the viewer and/or a server device connected to a terminal device of the distributer via a communication line, or a terminal device of the distributer.

In the video processing method according to the thirteenth aspect, the receiving step is executed by a terminal device of the viewer and/or a terminal device of the distributer via a communication line, or a terminal device of the distributer determines that the combination satisfies the predetermined condition, and the generation of the video including the animation in which the second gift is attached is executed by the terminal device of the viewer.

In the video processing method according to the fourteenth aspect, in the thirteenth aspect, when it is determined that the combination satisfies the predetermined condition, the terminal device of the server device or the distributer transmits information related to the second gift to the terminal device of the viewer.

In the video processing method according to the fifteenth aspect, the application of the first gift to the avatar object in the first mode is executed for each fitted portion of the avatar object, and the fitted portion is located at a portion of the avatar object and/or a portion separated from the avatar object.

In the video processing method according to the sixteenth aspect, in the first aspect, the processor is a central processing unit (CPU), a microprocessor, or a graphics processing unit (GPU).

In the video processing method according to the seventeenth aspect, in the first aspect, the communication line includes the Internet.

A server device according to the eighteenth aspect comprises "one or a plurality of processors, wherein the processor receives a request signal which is generated on the basis of an operation of a viewer viewing a video including an animation of an avatar object of a distributer, receives a request signal for requesting that a first gift is given to the avatar object from a terminal device of the viewer via a communication line, and when it is determined on the basis of the plurality of request signals that the combination of the plurality of first gifts applied to the avatar object satisfies a predetermined condition and generating the video including an animation in which a second gift having a characteristic common to the first gift is attached to the avatar object."

In the nineteenth aspect, the server device according to the eighteenth aspect is a central processing unit (CPU), a microprocessor, or a graphics processing unit (GPU).

A server device according to the twentieth aspect of the present invention is characterized in that "the communication line includes the Internet" in the eighteenth aspect."

A server device according to the twenty-first aspect is provided with "one or a plurality of processors, wherein the processor receives, from a terminal device of the viewer via a communication line, a request signal which is generated on the basis of an operation of a viewer who views a video including an animation of an avatar object of a distributer, and requests the avatar object to impart a first gift to the avatar object when it is determined that the combination of the plurality of first gifts imparted to the avatar object satisfies a predetermined condition on the basis of the plurality of request signals, and transmit, to a terminal device of the viewer or a terminal device of the distributer for generating the video including an animation in which the second gift is attached to the avatar object, information relating to the second gift having a characteristic common to the first gift when the combination of a plurality of the first gift given to the avatar object according to the plurality of the request singles is met."

In the twenty-second aspect, the server device according to the twenty-second aspect is characterized in that the processor is a central processing unit (CPU), a microprocessor, or a graphics processing unit (GPU).

A server device according to the twenty-third aspect of the present invention is characterized in that "the communication line includes the Internet" in the twenty-second embodiment.

A computer program according to the twenty-fourth aspect is generated on the basis of an operation of a viewer who views a video including an animation of an avatar object of a distributer "by being executed by one or a plurality of processors, receives a request signal for requesting that a first gift is given to the avatar object from a terminal device of the viewer via a communication line, and when it is determined on the basis of the plurality of request signals that the combination of the plurality of first gifts applied to the avatar object satisfies a predetermined condition, generates the video including an animation in which a second gift having a characteristic common to the first gift is attached to the avatar object."

In the twenty-fourth aspect, the computer program according to the twenty-fifth aspect is a central processing unit (CPU), a microprocessor, or a graphics processing unit (GPU).

A computer program according to the twenty-sixth aspect of the present invention is characterized in that "the communication line includes the Internet" in the twenty-fourth aspect.

A computer program according to the twenty-seventh aspect is generated on the basis of an operation of a viewer who views a video including an animation of an avatar object of a distributer "by being executed by one or a plurality of processors, receives a request signal for requesting that a first gift is given to the avatar object from a terminal device of the viewer via a communication line, and when it is determined that the combination of the plurality of first gifts imparted to the avatar object satisfies a predetermined condition on the basis of the plurality of request signals, transmits, to a terminal device or a server device of the viewer for generating the video including an animation in which the second gift is attached to the avatar object, information related to a second gift having a characteristic common to the first gift."

In the twenty-second aspect, the computer program according to the twenty-eighth aspect is a central processing unit (CPU), a microprocessor, or a graphics processing unit (GPU).

A computer program according to the twenty-ninth aspect of the present invention is characterized in that "the communication line includes the Internet" in the 27th aspect.

A computer program according to the 30th aspect is generated on the basis of an operation of a viewer who views a video including an animation of an avatar object of a distributer by being executed by one or a plurality of processors, and transmits a request signal for requesting that a first gift is given to the avatar object via a communication line When it is determined on the basis of the plurality of request signals that the combination of the plurality of first gifts applied to the avatar object satisfies a predetermined condition, and generates the video including an animation in which a second gift having a feature common to the first gift is attached to the avatar object, the processor is made to function so as to receive information related to the second gift from a terminal device or a server device of the distributer."

The computer program according to the thirty-first aspect is "wherein the processor is the central processing unit (CPU), a microprocessor, or a graphics processing unit (GPU)" in the thirtieth aspect.

A computer program according to the thirty-second aspect of the present invention is characterized in that "the communication line includes the Internet" in the 30th aspect.

A computer program according to the thirty-third aspect is generated on the basis of an operation of a viewer who views a video including an animation of an avatar object of a distributer "by being executed by one or a plurality of processors, and transmits a request signal for requesting that a first gift is given to the avatar object via a communication line When it is determined that the combination of the plurality of first gifts imparted to the avatar object satisfies a predetermined condition on the basis of the plurality of request signals, receives, from a terminal device or a server device of the distributer, an animation including an animation in which a second gift having a characteristic common to the first gift is attached to the avatar object."

The computer program according to the thirty-third aspect is "wherein the processor is the central processing unit (CPU), a microprocessor, or a graphics processing unit (GPU)" in the twenty-third aspect.

A computer program according to the thirty-fifth aspect of the present invention is characterized in that "the communication line includes the Internet" in the above-mentioned thirty-third aspect.

7. FIELD TO WHICH THE TECHNOLOGY DISCLOSED CAN BE APPLIED

The technology disclosed in the present application can be applied, for example, in the following field.

(1) An application or a service for distributing a live video and a game in which an avatar object appears.

(2) An application or a service capable of communicating using characters and avatar objects. (chat application, messenger, mail application, etc.)

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Japanese Laid-Open Patent Application No. 2012-120098 discloses a way to electronically realize an act of gifting, and REALITY (registered trademark) provides a video distribution service where a viewer can perform gifting for each of fitted portions (for example, a head, a neck, and a hand) of an avatar (distributer). See "REALITY", [Online], (https://twitter.com/WFLE_REALITY), searched on Aug. 27, 2019. The entire contents of Japanese Laid-Open Patent Application No. 2012-120098 and "REALITY" are incorporated herein by reference.

DESCRIPTION OF NUMERALS 1 video distribution system
10a-10d terminal device
20 server device
20A gift API server device
20B information processing server device
20C distribution server device
20D comment API server device
100 video generation unit
220 gift processing unit
230 database unit
240 determination unit
250 comment processing unit
400 avatar object
401, 402 videos
420, 420 first gift
420Z second gift
500 table
1000 web server device

What is claimed is:

1. A video processing method performed by execution of a computer-readable command by one or more processors, the video processing method comprising:
  receiving, from a terminal device of a viewer of a video including an animation of an avatar object of a distributer via a communication line, a request signal for a first gift to the avatar object, the request signal being generated based on an operation of the viewer of the video, and
  generating the video including an animation of the avatar object fitted with a second gift having an aesthetic feature common to the first gift when it is determined that a combination of a plurality of the first gifts given to the avatar object based on a plurality of the request signals satisfies a predetermined condition relating to the first gifts, wherein the determination that the combination satisfies the predetermined condition is performed based on a reference table for storing types of the first gift given to the avatar object and a given number for each type of the first gift in association with each other.

2. The video processing method according to claim 1, wherein the avatar object is a first avatar object generated based on an operation of the distributer.

3. The video processing method according to claim 1, wherein the avatar object is a second avatar object related to a game generated based on an action or an operation of the distributer.

4. The video processing method according to claim 1, wherein the second gift changes a size, a color, a shape, or at least a portion of configurations of the first gift.

5. The video processing method according to claim 1, further comprising transmitting, to a terminal device of a plurality of viewers, comment information indicating a necessary condition for the combination to satisfy the predetermined condition when the combination of the plurality of first gifts does not satisfy the predetermined condition.

6. The video processing method according to claim 1, further comprising transmitting, to a terminal device of a plurality of viewers, comment information indicating that the first gift is given to the avatar object and/or that the first gift is fitted to the avatar object in response to the request signal received from the terminal device of a certain viewer.

7. The video processing method according to claim 1, further comprising setting a duration for maintaining the second gift in the video and deleting the second gift from the video when the duration has elapsed when the combination satisfies the predetermined condition.

8. The video processing method according to claim 1, wherein the receiving and the generating are executed by a server device connected to the terminal device of the viewer and/or the terminal device of the distributer via the communication line.

9. The video processing method according to claim 8, wherein the determination is performed by the server device.

10. The video processing method according to claim 1, wherein the generating is performed by the terminal device of the distributer.

11. The video processing method according to claim 10, wherein a server device connected to the terminal device of the viewer and/or the terminal device of the distributer via the communication line, or the terminal device of the distributer determines that the combination satisfies the predetermined condition.

12. The video processing method according to claim 1, wherein the receiving is performed by a server device connected to the terminal device of the viewer and/or the terminal device of the distributer via the communication line, or the terminal device of the distributer, wherein the server device or the terminal device of the distributer determines that the combination satisfies the predetermined condition, and wherein the terminal device of the viewer performs the generating of the video including the animation with the second gift.

13. The video processing method according to claim 12, wherein the server device or the terminal device of the distributer transmits information related to the second gift to the terminal device of the viewer when it is determined that the combination satisfies the predetermined condition.

14. The video processing method according to claim 1, wherein gifting of the first gift to the avatar object is performed for each fitted portion of the avatar object, and the fitted portion is at a portion of the avatar object or a portion away from the avatar object.

15. The video processing method according to claim 1, wherein the processor is a central processing unit (CPU), a microprocessor, or a graphics processing unit (GPU).

16. The video processing method according to claim 1, wherein the communication line includes the Internet.

17. A server device, comprising:
  one or more processors, wherein the processor is configured to:
    receive, from a terminal device of a viewer of a video including an animation of an avatar object of a distributer via a communication line, a request signal for a first gift to the avatar object, the request signal being generated based on an operation of a viewer of the video, and generate the video including an animation of the avatar object fitted with a second gift having an aesthetic feature common to the first gift when it is determined that a combination of a plurality of the first gifts given to the avatar object based on a plurality of the request signals satisfies a predetermined condition relating to the first gifts, wherein the determination that the combination satisfies the predetermined condition is performed based on a reference table for storing types of the first gift given to the avatar object and a given number for each type of the first gift in association with each other.

18. The server device according to claim 17, wherein the processor is a central processing unit (CPU), a microprocessor, or a graphics processing unit (GPU).

19. The server device according to claim 17, wherein the communication line includes the Internet.

20. A server device, comprising:
one or more processors, wherein the processor is configured to:
receive, from a terminal device of a viewer of a video including an animation of an avatar object of a distributer via a communication line, a request signal for a first gift to the avatar object, the request signal being generated based on an operation of the viewer of the video, and
transmit information related to a second gift having an aesthetic feature common to the first gift to the terminal device of the viewer generating the video including an animation of the avatar object fitted with the second gift or to a terminal device of a distributer when it is determined that a combination of a plurality of the first gifts given to the avatar object based on a plurality of the request signals satisfies a predetermined condition relating to the first gifts, wherein the determination that the combination satisfies the predetermined condition is performed based on a reference table for storing types of the first gift given to the avatar object and a given number for each type of the first gift in association with each other.

21. The server device according to claim 20, wherein the processor is a central processing unit (CPU), a microprocessor, or a graphics processing unit (GPU).

22. The server device according to claim 20, wherein the communication line includes the Internet.

* * * * *